(12) United States Patent
Shimoda

(10) Patent No.: US 10,365,767 B2
(45) Date of Patent: Jul. 30, 2019

(54) AUGMENTED REALITY IMAGE PROCESSING APPARATUS AND METHOD, AND PROGRAM

(71) Applicant: Sony Corporation, Tokyo (JP)

(72) Inventor: Ryuichi Shimoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 14/778,963

(22) PCT Filed: Mar. 14, 2014

(86) PCT No.: PCT/JP2014/056829
§ 371 (c)(1),
(2) Date: Sep. 21, 2015

(87) PCT Pub. No.: WO2014/156706
PCT Pub. Date: Oct. 2, 2014

(65) Prior Publication Data
US 2016/0048230 A1  Feb. 18, 2016

(30) Foreign Application Priority Data
Mar. 28, 2013  (JP) .................................. 2013-070439

(51) Int. Cl.
*G06F 3/042* (2006.01)
*G06T 19/00* (2011.01)
(Continued)

(52) U.S. Cl.
CPC .............. *G06F 3/042* (2013.01); *G06F 3/011* (2013.01); *G06F 3/013* (2013.01); *G06F 3/017* (2013.01);
(Continued)

(58) Field of Classification Search
None
See application file for complete search history.

(56) References Cited

U.S. PATENT DOCUMENTS 8,306,331 B2   11/2012 Muramatsu et al.
8,467,580 B2   6/2013 Suito et al.
(Continued)

FOREIGN PATENT DOCUMENTS

CN   1604014 A   4/2005
EP   1404126 A2   3/2004
(Continued)

*Primary Examiner* — Sarah Le
(74) *Attorney, Agent, or Firm* — Wolf, Greenfield & Sacks, P.C.

(57) ABSTRACT

An image clipping unit clips a region on an input image where a virtual image subjected to touch operation by a user is displayed to obtain a clipped image, and a distance calculating unit performs stereo-matching on left and right clipped images to obtain a distance to each of objects on the clipped image. A touch coordinate calculating unit obtains a touch position of the user based on information of the distance, and a touch processing unit performs processing according to the touch position. A short distance image separating unit separates the object existing closer to the user side than the virtual image from the clipped image, using the information, to obtain a short distance image. The short distance image is combined with the virtual image, and the virtual image after the combining is combined with the input image to be displayed.

13 Claims, 22 Drawing Sheets

(51) Int. Cl.
*G06F 3/01* (2006.01)
*G06T 11/60* (2006.01)
*H04N 13/344* (2018.01)
*H04N 13/156* (2018.01)
*H04N 13/239* (2018.01)
*H04N 13/00* (2018.01)

(52) U.S. Cl.
CPC ............ *G06F 3/0426* (2013.01); *G06T 11/60* (2013.01); *G06T 19/006* (2013.01); *H04N 13/156* (2018.05); *H04N 13/239* (2018.05); *H04N 13/344* (2018.05); *G06F 2203/04104* (2013.01); *H04N 2013/0081* (2013.01)

(56) References Cited

U.S. PATENT DOCUMENTS

| | | | |
|---|---|---|---|
| 8,537,212 | B2 | 9/2013 | Kunihiro et al. |
| 9,400,869 | B2 | 7/2016 | Ootsuki et al. |
| 2005/0068314 | A1* | 3/2005 | Aso .................. G06T 19/006 345/419 |
| 2005/0234333 | A1 | 10/2005 | Takemoto et al. |
| 2006/0044327 | A1 | 3/2006 | Okuno et al. |
| 2006/0125824 | A1* | 6/2006 | Sfarti .................. G06T 17/205 345/423 |
| 2008/0075338 | A1 | 3/2008 | Muramatsu et al. |
| 2008/0166021 | A1 | 7/2008 | Suito et al. |
| 2009/0046924 | A1* | 2/2009 | Morimitsu ............ G01C 11/06 382/154 |
| 2010/0091096 | A1* | 4/2010 | Oikawa .................. G06F 3/011 348/53 |
| 2011/0234828 | A1 | 9/2011 | Kunihiro et al. |
| 2011/0316981 | A1* | 12/2011 | Iwabuchi ............. H04N 13/026 348/49 |
| 2012/0092300 | A1 | 4/2012 | Wang et al. |
| 2012/0223968 | A1* | 9/2012 | Kashimoto ............ G06T 11/00 345/633 |
| 2012/0302289 | A1 | 11/2012 | Kang |
| 2013/0106674 | A1* | 5/2013 | Wheeler ............ G02B 27/017 345/8 |
| 2014/0232899 | A1 | 8/2014 | Ootsuki et al. |
| 2017/0027442 | A1 | 2/2017 | Ootsuki et al. |

FOREIGN PATENT DOCUMENTS

| | | |
|---|---|---|
| EP | 1521482 A2 | 4/2005 |
| JP | 2001-282428 A | 10/2001 |
| JP | 2004-106682 A | 4/2004 |
| JP | 2005-293141 A | 10/2005 |
| JP | 2009-087161 A | 4/2009 |
| JP | 2011-198150 A | 10/2011 |
| JP | 2011-203823 A | 10/2011 |
| JP | 2012-007985 A | 1/2012 |
| JP | 2012-181809 A | 9/2012 |
| TW | 201218041 A | 5/2012 |
| WO | WO 2013/028908 A1 | 2/2013 |

* cited by examiner

AUGMENTED REALITY IMAGE PROCESSING APPARATUS AND METHOD, AND PROGRAM

CROSS REFERENCE TO RELATED APPLICATIONS

This application claims the benefit under 35 U.S.C. § 371 as a U.S. National Stage Entry of International Application No. PCT/JP2014/056829, filed in the Japanese Patent Office as a Receiving Office on Mar. 14, 2014, which claims priority to Japanese Patent Application Number JP2013-070439, filed in the Japanese Patent Office on Mar. 28, 2013, each of which is hereby incorporated by reference in its entirety.

TECHNICAL FIELD

The present technique relates to an image processing apparatus and method, and a program, and particularly relates to an image processing apparatus and method, and a program configured to be capable of improving operability.

BACKGROUND ART

Recently, by the advancement of a central processing unit (CPU), a graphics processing unit (GPU), and the like, virtual reality is realized utilizing a computer graphics (CG) image, and further augmented reality (AR) is also realized combining a actually photographed image and a virtual image utilizing the virtual reality.

For example, as a technique related to such augmented reality, there is proposed a technique of displaying an image superimposed on the position of an object existing in a real environment, and performing processing according to operation for the image (refer to Patent Literature 1, for example).

CITATION LIST

Patent Literature

Patent Literature 1: JP 2011-203823A

SUMMARY OF INVENTION

Technical Problem

In the above technique, however, the operation has to be performed by a preliminarily determined one such as a hand or a foot of a user, and therefore not only recognition processing of the hand, the foot, or the like has to be performed in the operation but also the operation is sometimes inconvenient, and thus operability is not high. Further, the image for the operation superimposed on the position of the object existing in the real environment is displayed, and therefore freedom degree is low and the operation is inconvenient.

The present technique is achieved in view of such a situation, and aims to improve the operability.

Solution to Problem

According to an aspect of the present technique, there is provided an image processing apparatus including: an image clipping unit configured to clip a predetermined region in a vicinity of a region where a virtual image to be operated is displayed, from two or more input images having respective parallaxes, to generate clipped images; a distance calculating unit configured to calculate distance information of an object in each region of the clipped images based on two or more of the clipped images; a touch position calculating unit configured to calculate a touch position of a user on the virtual image based on the distance information; a touch processing unit configured to cause processing according to the touch position to be performed; a short distance image separating unit configured to separate, for each of the clipped images, a region of the object that exists closer than the virtual image from the clipped image based on the distance information to generate a short distance image; a virtual image combining unit configured to combine, for each of the short distance images, the short distance image with the virtual image to generate a composite image; and a display image combining unit configured to combine, for each of the composite images, the composite image with the input image to generate two output images having respective parallaxes.

The touch position calculating unit can calculate a plurality of the touch positions. The touch processing unit can cause processing specified by the plurality of touch positions to be performed.

The virtual image can be displayed on a non-flat plane in a three-dimensional space. The touch position calculating unit can calculate the touch position based on a position of the clipped image having a distance indicated by the distance information equal to a distance to the virtual image, using a distance different for each region of the virtual image.

The touch position calculating unit can calculate the touch position based on a plurality of positions on the clipped image having a distance indicated by the distance information equal to a distance to the virtual image.

The input image can be combined with a plurality of the virtual images to form the output image. The touch position calculating unit can calculate the touch position for each of the virtual images.

The image processing apparatus can further include: a correction unit configured to correct a display position, a display size, or a shape of the virtual image or a distance to the virtual image based on a change in a position or a direction of the image processing apparatus.

The image processing apparatus can further include: a recognition unit configured to detect a preliminarily determined recognition target from the input image; a recognition target distance calculating unit configured to calculate a distance to the recognition target based on a detection result of the recognition target; and a determination unit configured to determine a display position of the virtual image and a distance to the virtual image based on a position of the recognition target and the distance to the recognition target.

The recognition target can be a palm of the user.

The image processing apparatus can further include: an obstacle determining unit configured to determine whether or not an obstacle exists between the virtual image and the image processing apparatus by detecting a preliminarily determined operation object from the short distance image.

The distance calculating unit can calculate the distance information by performing matching processing based on the clipped image.

The distance information can be a parallax in each region of the clipped image.

The touch processing unit can cause image display or sound reproduction to be performed according to the touch position.

The image processing apparatus can further include: an imaging unit configured to capture the input image.

According to an aspect of the present technique, there is provided an image processing method or a program including: clipping a predetermined region in a vicinity of a region where a virtual image to be operated is displayed, from two or more input images having respective parallaxes, to generate clipped images; calculating distance information of an object in each region of the clipped images based on two or more of the clipped images; calculating a touch position of a user on the virtual image based on the distance information; causing processing according to the touch position to be performed; separating, for each of the clipped images, a region of the object that exists closer than the virtual image from the clipped image based on the distance information to generate a short distance image; combining, for each of the short distance images, the short distance image with the virtual image to generate a composite image; and combining, for each of the composite images, the composite image with the input image to generate two output images having respective parallaxes.

According to an aspect of the present technique, a predetermined region in a vicinity of a region where a virtual image to be operated is displayed is clipped, from two or more input images having respective parallaxes, to generate clipped images; distance information of an object in each region of the clipped images is calculated based on two or more of the clipped images; a touch position of a user on the virtual image is calculated based on the distance information; processing according to the touch position is caused to be performed; for each of the clipped images, a region of the object that exists closer than the virtual image is separated from the clipped image based on the distance information to generate a short distance image; for each of the short distance images, the short distance image is combined with the virtual image to generate a composite image; and, for each of the composite images, the composite image is combined with the input image to generate two output images having respective parallaxes.

Advantageous Effects of Invention

According to an aspect of the present technique, operability can be improved.

DESCRIPTION OF EMBODIMENTS

Hereinafter, there will be explained embodiments to which the present technique is applied with reference to drawings.

First Embodiment (Outline of the Present Technique)

The present technique realizes a 3D user interface to cause a user who wears a display apparatus such as a head-mount display and glasses having an image display function, to feel as if performing operation of actually touching a virtual image of augmented reality which uses a twin-lens camera for input.

For example, the present technique can be applied to the operation of various kinds of electronic device such as an audio device, a multi-function type mobile phone, an electronic book reader, and also applied to a medical field, a game machine operation, a concert, a movie, an attraction, and the like.

Figure 1:
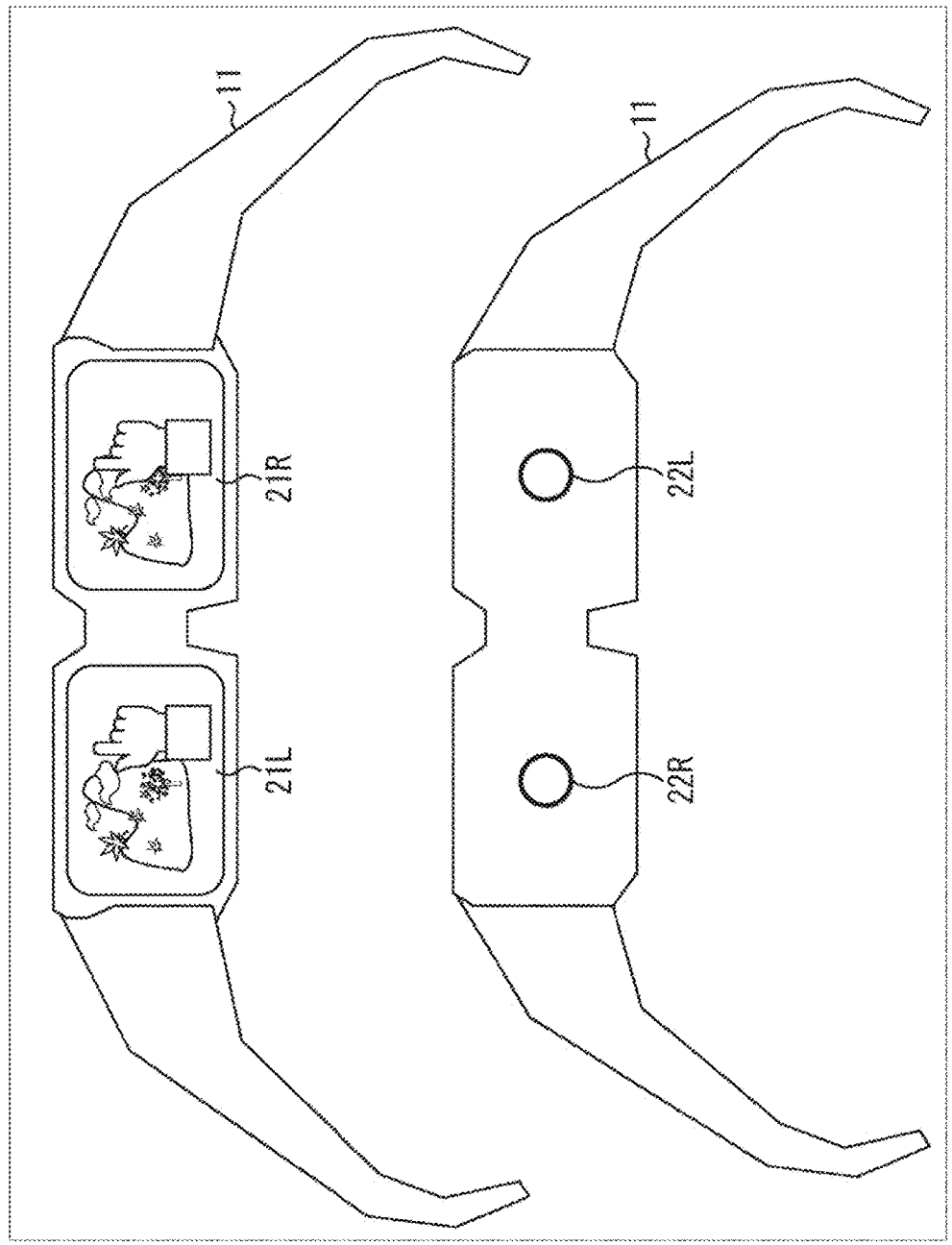
FIG. 1 is a diagram illustrating an exemplary configuration of an appearance of a display apparatus.

In the following, the present technique will be explained as one example of applying the present technique to a glass-type display apparatus. In such a case, as shown in FIG. 1 on the upper side, for example, an image display unit 21L and an image display unit 21R are provided on the rear side of a display apparatus 11, that is, on the plane facing the left and right eyes of a user when the user wears the display apparatus 11. These image display unit 21L and image display unit 21R are display devices to present images to the left eye and the right eye of the user, respectively.

Note that, in the following, when the image display unit 21L and the image display unit 21R do not have to be distinguished in particular, each of them will be also simply called an image display unit 21.

Further, an imaging unit 22L and an imaging unit 22R are provided on the front side of the display apparatus 11, that is, on the plane located on the side opposite to the side of the user's eyes when the user wears the display apparatus 11. These imaging unit 22L and imaging unit 22R capture images which have viewing points located at approximately the same positions as those of the user's left and right eyes to have respective parallaxes. Note that, in the following, when the imaging unit 22L and the imaging unit 22R do not have to be distinguished in particular, each of them will be also simply called an imaging unit 22.

Figure 2:
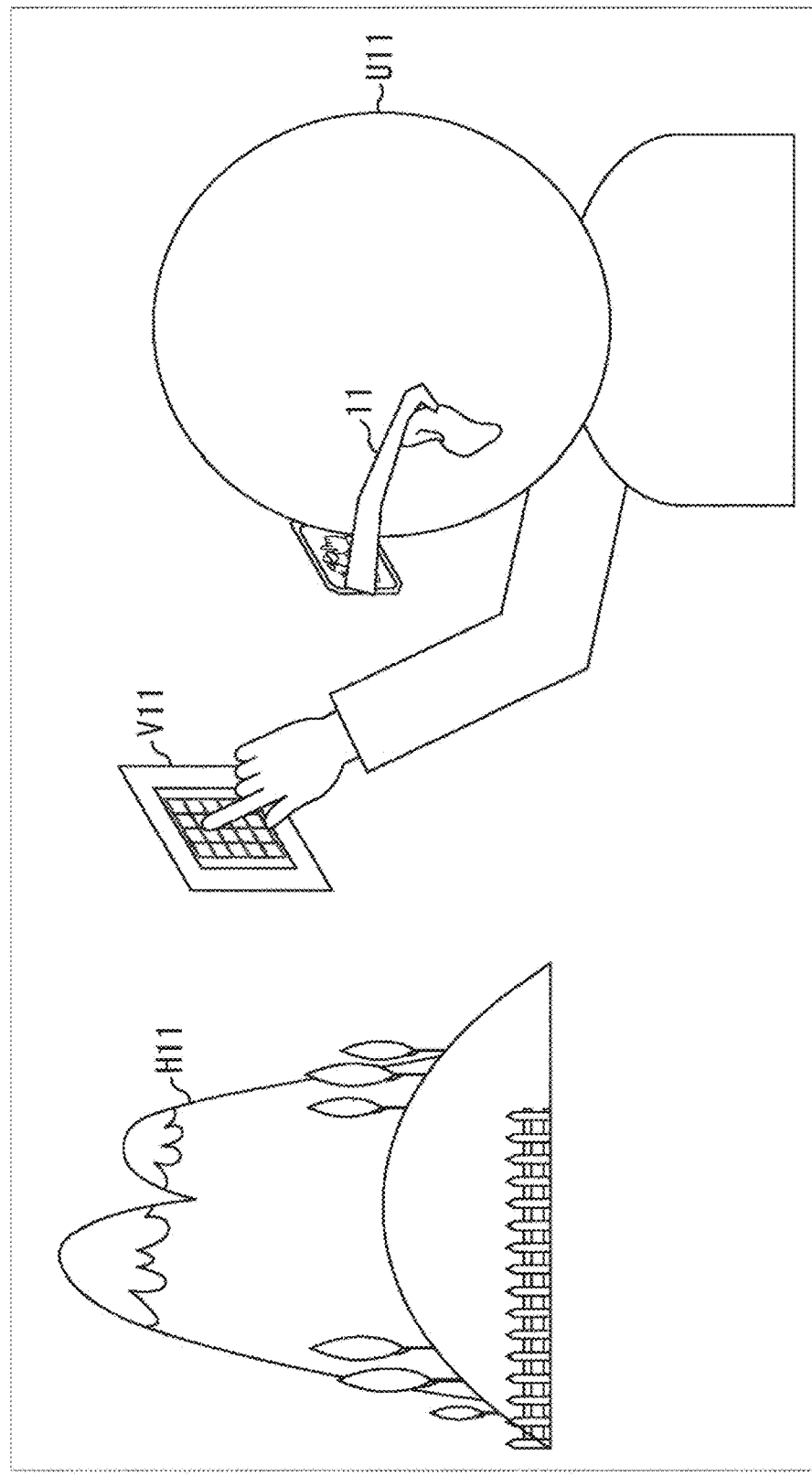
FIG. 2 is a diagram explaining operation for a virtual image.

The display apparatus 11 like this is worn by a user U11 on the head to be used as shown in FIG. 2. In this example, the imaging unit 22 provided on the display apparatus 11 captures an image of an object H11 or the like existing in front of the user U11 as an object. Then, the display apparatus 11 combines a predetermined virtual image V11 with an input image captured by the imaging unit 22, and displays a resultantly obtained output image on the image display unit 21.

Here, the virtual image V11 is an image of a 3D user interface to be operated when the execution of various kinds of processing is instructed to the display apparatus 11, such as an image of a virtual button or touch panel to be operated by the user, for example.

The user U11, while watching the output image displayed on the image display unit 21, performs touch operation for the virtual image V11 by stretching a hand to the virtual image V11 which is displayed as if existing in a real space. That is, the user performs operation such as pushing of a button displayed on the virtual image V11.

Then, when the user U11 performs the operation for the virtual image V11, the display apparatus 11 performs processing corresponding to the operation.

In the display apparatus 11, the input images captured by the imaging unit 22L and the imaging unit 22R are images having respective parallaxes, and the virtual images V11 on the output images displayed respectively on the image display unit 21L and image display unit 21R also have the parallaxes. Accordingly, the output images presented to the left and right eyes of the user U11 form stereoscopic images having respective parallaxes.

In this manner, the display apparatus 11 displays a stereoscopic image as the output image, and thereby can realize a user interface which allows the user to easily have a feeling of distance and not to feel stress. This user interface is a space touch interface using a real 3D augmented reality.

Note that, in the following, an image for the user's left eye such as the input image captured by the imaging unit 22L will be simply called a left image, and similarly an image for the user's right eye such as the input image captured by the imaging unit 22R will be simply called a right image.

(Exemplary Configuration of the Display Apparatus)

Figure 3:
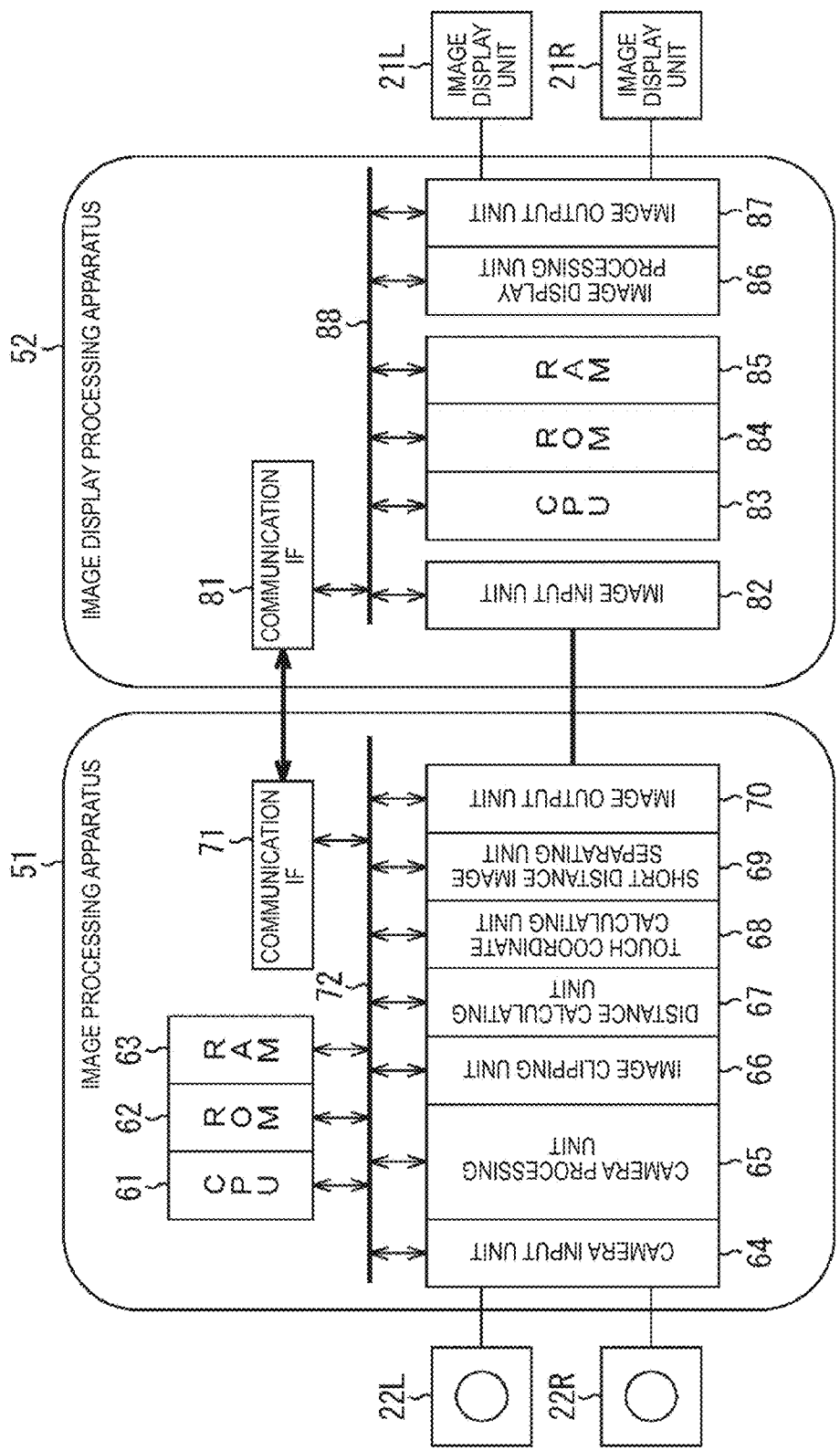
FIG. 3 is a diagram illustrating an exemplary configuration of a display apparatus.

Next, there will be explained a specific configuration of the display apparatus 11 shown in FIG. 1. FIG. 3 is a diagram illustrating an exemplary configuration of the display apparatus 11. Note that, in FIG. 3, the same sign is attached to a part corresponding to a part in FIG. 1 and the explanation thereof will be omitted appropriately.

The display apparatus 11 is configured from the imaging unit 22L, the imaging unit 22R, an image processing apparatus 51, an image display processing apparatus 52, the image display unit 21L, and the image display unit 21R. In this example, the image processing apparatus 51 and the image display processing apparatus 52 are connected by communication, and the display apparatus 11 is realized by the processing apparatuses and a program.

The imaging unit 22L and the imaging unit 22R are configured from cameras having viewing points different from each other, and capture the input images to supply them to the image processing apparatus 51. For example, the captured input images are supplied to the image processing apparatus 51 sequentially frame by frame.

The image processing apparatus 51 is configured from a CPU 61, a read only memory (ROM) 62, a random access memory (RAM) 63, a camera input unit 64, a camera processing unit 65, an image clipping unit 66, a distance calculating unit 67, a touch coordinate calculating unit 68, a short distance image separating unit 69, an image output unit 70, a communication interface (IF) 71, and a bus 72. In the image processing apparatus 51, the CPU 61 to the communication IF 71 are mutually connected via the bus 72.

The CPU 61 controls the whole operation of the image processing apparatus 51 using a program and data recorded in the ROM 62 or the RAM 63. The ROM 62 records an image, various kinds of data, a program, and the like. The RAM 63 records an image, various kinds of data, a program, and the like temporarily, and the data and the like recorded in the RAM 63 are read out as needed.

The camera input unit 64 obtains image data of the input image from the imaging unit 22, and performs data format conversion of the input image and the like as needed to supply the resultant image data to the camera processing unit 65. The camera processing unit 65 performs correction processing of distortion and the like and development processing on the input image.

The image clipping unit 66 clips a partial region of the input image output from the camera processing unit 65 to obtain a clipped image. The distance calculating unit 67 calculates a distance to the object for each region on the clipped image. Here, the distance to the object is a distance from the imaging unit 22 to the object in a real space.

The touch coordinate calculating unit 68 calculates the coordinates of a touch position of the user on the virtual image based on the calculation result of the distance calculating unit 67, and supplies the calculation result to the image display processing apparatus 52 via the bus 72 and the communication IF 71.

The short distance image separating unit 69 generates a short distance image in which only an object existing closer than the virtual image disposed in the three-dimensional space, that is, an object located on the user side is displayed, based on the calculation result in the distance calculating unit 67 and the clipped image, and supplies the short distance image to the image output unit 70. Specifically, the short distance image separating unit 69 performs image separation on the clipped image to form the short distance image based on the distance between the virtual image and the display apparatus 11 in the three-dimensional space.

The image output unit 70 outputs the short distance image from the short distance image separating unit 69 and the input image from the camera processing unit 65 to the image display processing apparatus 52. The communication IF 71 performs information transmission and reception with the image display processing apparatus 52. For example, the communication IF 71 transmits control information and various kinds of information from each of the units in the image processing apparatus 51 to the image display processing apparatus 52.

Further, the image display processing apparatus 52 is configured from a communication IF 81, an image input unit 82, a CPU 83, a ROM 84, a RAM 85, an image display processing unit 86, an image output unit 87, and a bus 88. In the image display processing apparatus 52, the communication IF 81 to the image output unit 87 are mutually connected via the bus 88.

The communication IF 81 performs information transmission and reception with the communication IF 71. The image input unit 82 is connected to the image output unit 70, and outputs an image to each of the units in the image display processing apparatus 52 via the bus 88, on receiving the supply of the image from the image output unit 70. For example, the image input unit 82 receives the supply of the short distance image and the input image from the image output unit 70.

The CPU 83 performs various kinds of control and image processing using a program and data recorded in the ROM 84 or the RAM 85 and the information and image supplied from the image processing apparatus 51. For example, the CPU 83 combines the short distance image with the virtual image recorded in the ROM 84, and generates the output image by combining the virtual image combined with the short distance image, further with the input image.

The ROM 84 records various kinds of image such as the virtual image, data, a program, and the like. The RAM 85 records an image, various kinds of data, a program, and the like temporarily.

The image display processing unit 86 performs image processing such as buffer processing on images such as the output image to be displayed on the image display unit 21. The image output unit 87 outputs an image such as the output image subjected to the image processing in the image display processing unit 86 to the image display unit 21 for display.

(Touch Operation and Image Display)

Subsequently, with reference to FIG. 4, there will be explained a processing flow performed by the display apparatus 11 of FIG. 3. Note that, in FIG. 4, the same sign is attached to a part corresponding to a part in FIG. 3 and the explanation thereof will be omitted appropriately.

In FIG. 3, a determination unit 121L and a determination unit 121R are realized by the CPU 61 and the CPU 83, and each of an image clipping unit 66L and an image clipping unit 66R is realized by the image clipping unit 66. Further, each of a touch coordinate calculating unit 68L and a touch coordinate calculating unit 68R is realized by the touch coordinate calculating unit 68, and each of a short distance image separating unit 69L and a short distance image separating unit 69R is realized by the short distance image separating unit 69. Further, a touch processing unit 122, a virtual image combining unit 123L, a virtual image combining unit 123R, a display image combining unit 124L, and a display image combining unit 124R are realized by the CPU 83.

Note that, in the following, when the determination unit 121L and the determination unit 121R do not have to be distinguished in particular, each of them will be also simply called a determination unit 121, and when the image clipping unit 66L and the image clipping unit 66R do not have to be distinguished in particular, each of them will be also simply called an image clipping unit 66.

Further, in the following, when the touch coordinate calculating unit 68L and the touch coordinate calculating unit 68R do not have to be distinguished in particular, each of them will be also simply called a touch coordinate calculating unit 68, and when the short distance image separating unit 69L and the short distance image separating unit 69R do not have to be distinguished in particular, each of them will be also simply called the short distance image separating unit 69. Further, when the virtual image combining unit 123L and the virtual image combining unit 123R do not have to be distinguished in particular, each of them will be also simply called a virtual image combining unit 123, and when the display image combining unit 124L and the display image combining unit 124R do not have to be distinguished in particular, each of them will be also simply called a display image combining unit 124.

In the display apparatus 11, first the imaging unit 22L and the imaging unit 22R capture a left input image IPL and a right input image IPR which are the input images for the left eye and the right eye, respectively. Then, the left input image IPL is supplied to the image clipping unit 66L and the display image combining unit 124L, and the right input image IPR is supplied to the image clipping unit 66R and the display image combining unit 124R.

These left input image IPL and right input image IPR are images having respective parallaxes.

Further, the determination unit 121L determines a virtual image V21L to be combined with the left input image IPL, and the display position, size, and distance of the virtual image V21L. Here, the display position and size of the virtual image V21L are a position and size on the output image. Further, the distance of the virtual image V21L to be displayed is a distance from the imaging unit 22 to the virtual image V21L in the real space, or more specifically, the three-dimensional augmented reality space.

The determination unit 121L supplies the determined display position, size, and distance of the virtual image V21L to the image clipping unit 66L and the display image combining unit 124L, and also supplies the virtual image V21L to the virtual image combining unit 123L.

Note that, actually, the display position, size, and distance of the left input image IPL are supplied from the CPU 61 to the image clipping unit 66 and the CPU 83, and the virtual image V21L is read out from the ROM 84 by the CPU 83.

Similarly, the determination unit 121R determines a virtual image V21R to be combined with the right input image IPR, and the display position, size, and distance of the virtual image V21R.

The determination unit 121R supplies the determined display position, size, and distance of the virtual image V21R to the image clipping unit 66R and the display image combining unit 124R, and also supplies the virtual image V21R to the virtual image combining unit 123R.

The image clipping unit 66L clips a region on the left input image IPL which is determined by the display position, size, and distance of the virtual image V21L and a parallax margin, to form a clipped image CPL, and supplies the clipped image CPL to the distance calculating unit 67. Similarly, the image clipping unit 66R clips a region on the right input image IPR which is determined by the display position, size, and distance of the virtual image V21R and the parallax margin, to form a clipped image CPR, and supplies the clipped image CPR to the distance calculating unit 67.

Since the clipped image CPL and the clipped image CPR are images close to regions where the virtual images are displayed on the input images, each of the clipped images becomes an image including a user's hand or the like which is to be operated for the virtual image. Note that, while the operation for the virtual image may be performed not only by the user's hand but also by any tool like a pen, in the following explanation, the user will be assumed to perform the touch operation for the virtual image by the hand.

The distance calculating unit 67 calculates the distance of an object existing in each region on the clipped image based on the clipped image CPL and the clipped image CPR, and supplies the calculation results to the touch coordinate calculating unit 68L, the touch coordinate calculating unit 68R, the short distance image separating unit 69L, and the short distance image separating unit 69R. Further, the distance calculating unit 67 supplies the clipped image CPL to the short distance image separating unit 69L, and also supplies the clipped image CPR to the short distance image separating unit 69R.

The touch coordinate calculating unit 68L calculates the coordinates of a user's touch position for the virtual image V21L based on the calculation result of the distance calculating unit 67, and supplies the calculation result to the touch processing unit 122. Similarly, the touch coordinate calculating unit 68R calculates the coordinates of a user's touch position for the virtual image V21R based on the calculation result of the distance calculating unit 67, and supplies the calculation result to the touch processing unit 122.

The touch processing unit 122 causes each of the units in the display apparatus 11 to perform processing according to the calculation results of the touch position coordinates from the touch coordinate calculating unit 68L and the touch coordinate calculating unit 68R.

The short distance image separating unit 69L generates a short distance image NPL from the clipped image CPL based on the calculation result of the distance calculating unit 67, and supplies the short distance image NPL to the virtual image combining unit 123L. Similarly, the short distance image separating unit 69R generates a short distance image NPR from the clipped image CPR based on the calculation result of the distance calculating unit 67, and supplies the short distance image NPR to the virtual image combining unit 123R.

The virtual image combining unit 123L combines the short distance image NPL from the short distance image separating unit 69L onto the virtual image V21L supplied from the determination unit 121L to form a composite image MPL, and supplies the composite image MPL to the display image combining unit 124L. The virtual image combining unit 123R combines the short distance image NPR from the short distance image separating unit 69R onto the virtual image V21R supplied from the determination unit 121R to form a composite image MPR, and supplies the composite image MPR to the display image combining unit 124R. The virtual image combining unit 123 performs the image combining so as to cause the short distance image to be displayed on the front side of the virtual image.

The display image combining unit 124L combines the composite image MPL from the virtual image combining unit 123L onto a region on the left input image IPL which is determined by the display position and size supplied from the determination unit 121L to form a left output image OPL. The display image combining unit 124R combines the composite image MPR from the virtual image combining unit 123R onto a region on the right input image IPR which is determined by the display position and size supplied from the determination unit 121R to form a right output image OPR. The display image combining unit 124 performs the image combining so as to cause the composite image to be displayed on the front side of the input image.

The left output image OPL and the right output image OPR which are obtained in this manner and have respective parallaxes are presented to the user as the output image.

(Object Distance Calculation)

Further, with reference to FIG. 5, the calculation of the distance to the object in each region on the clipped image, performed by the distance calculating unit 67 will be explained more specifically. Note that, in FIG. 5, the same sign is attached to a part corresponding to a part in FIG. 4 and the explanation thereof will be omitted appropriately.

In this example, a level adjustment unit 151L and a level adjustment unit 151R perform level adjustment of the clipped image CPL and the clipped image CPR from the image clipping unit 66L and the image clipping unit 66R, and supplies the level-adjusted images to a reduction unit 152L and tip vicinity extraction unit 155L and a reduction unit 152R and tip vicinity extraction unit 155R, respectively. In the level adjustment, level correction is performed so that brightness, that is, a luminance level is approximately the same between the clipped image CPL and the clipped image CPR.

The reduction unit 152L and the reduction unit 152R reduce the sizes of the clipped image CPL and the clipped image CPR from the level adjustment unit 151L and the level adjustment unit 151R to 1/n, and supplies the reduced images to a stereo-matching unit 153.

Note that, in the following, when the level adjustment unit 151L and the level adjustment unit 151R do not have to be distinguished in particular, each of them will be also simply called a level adjustment unit 151, and when the reduction unit 152L and the reduction unit 152R do not have to be distinguished in particular, each of them will be also simply called a reduction unit 152.

The stereo-matching unit 153 calculates a sum of absolute differences (SAD), a sum of squared differences (SSD), a cross correlation (CC), or the like, for example, and thereby performs the stereo-matching of the clipped image CPL and the clipped image CPR after the reduction which are supplied from the reduction unit 152.

Information to indicate a parallax in each region of the clipped image is obtained by this stereo-matching. By using the parallax between the clipped image CPL and the clipped image CPR in each region, the known distance between the imaging unit 22L and the imaging unit 22R, and the focal length in each of the imaging units 22, it is possible to calculate the distance from the display apparatus 11 to the object in the three-dimensional space. Accordingly, the parallax between the clipped images in each region which is obtained as a calculation result of the stereo-matching means distance information indicating the distance from the display apparatus 11 (imaging unit 22) to the object in each region of the clipped image in the three-dimensional space.

Each of a tip coordinate calculating unit 154L and a tip coordinate calculating unit 154R calculates the coordinates for a tip position of a user's hand which performs the touch operation, based on the stereo-matching calculation result supplied from the stereo-matching unit 153.

For example, among regions on the clipped image, the coordinates of a region where the parallax d obtained by the stereo-matching matches a parallax D indicating the distance from the imaging unit 22 to the virtual image are extracted. Then, when the extracted coordinate point exists around a point (region) of d>D, a tip center value among the points of d=D is defined to be the tip position coordinates of the user's hand which performs the touch operation, that is, the touch position of the user.

In other words, this processing extracts a region of the object existing at a position of the virtual image in the three-dimensional space from among the regions of the clipped image, and the position of the extracted region is defined to be the touch position of the user.

The tip vicinity extraction unit 155L clips a region around the tip position indicated by the coordinates supplied from the tip coordinate calculating unit 154L in the clipped image supplied from the level adjustment unit 151L to obtain a vicinity image, and supplies the vicinity image to the correction stereo-matching unit 156. Similarly, the tip vicinity extraction unit 155R clips a region around the tip position indicated by the coordinates supplied from the tip coordinate calculating unit 154R in the clipped image supplied from the level adjustment unit 151R to obtain a vicinity image, and supplies the vicinity image to the correction stereo-matching unit 156.

Note that, in the following, when the tip coordinate calculating unit 154L and the tip coordinate calculating unit 154R do not have to be distinguished in particular, each of them will be also simply called a tip coordinate calculating unit 154, and, when the tip vicinity extraction unit 155L and the tip vicinity extraction unit 155R do not have to be distinguished in particular, each of them will be also simply called a tip vicinity extraction unit 155.

The correction stereo-matching unit 156 performs the stereo-matching using the vicinity image from the tip vicinity extraction unit 155L and the vicinity image from the tip vicinity extraction unit 155R, and supplies the result to the touch coordinate calculating unit 68L and the touch coordinate calculating unit 68R.

The touch coordinate calculating unit 68 calculates the coordinates of the user's touch position based on the stereo-matching result supplied from the correction stereo-matching unit 156.

Figure 6:
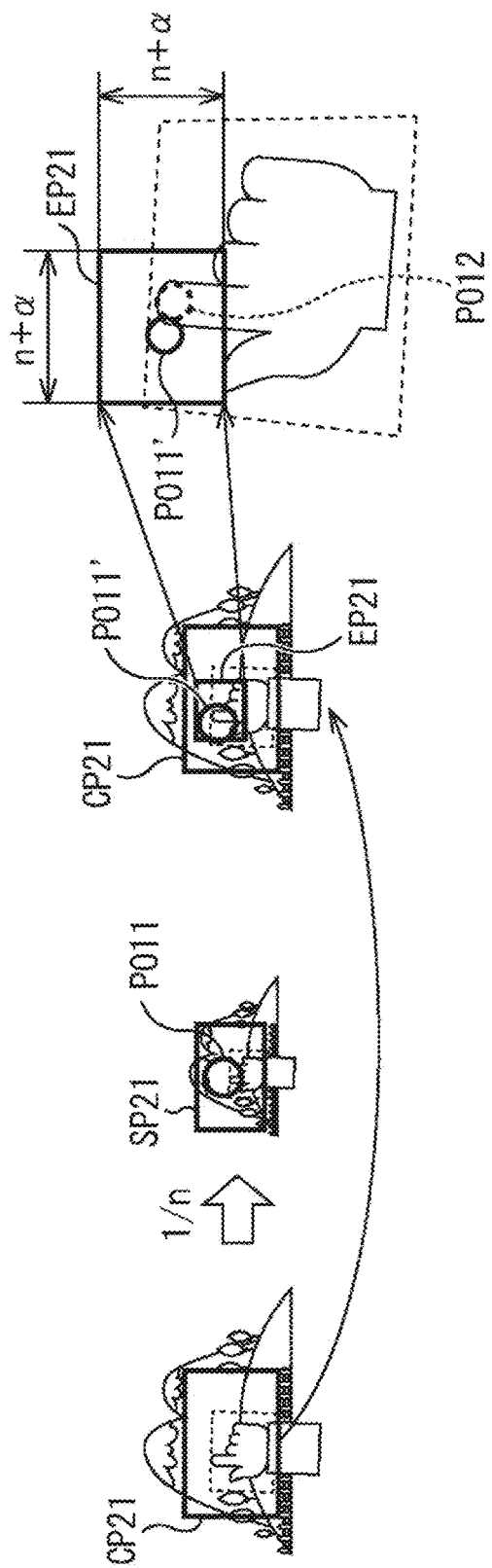
FIG. 6 is a diagram explaining calculation of a touch position.

For example, as shown in FIG. 6, a clipped image CP21 is assumed to be reduced to 1/n to give an image SP21. The stereo-matching unit 153 performs the stereo-matching for each of the left and right images SP21, and further the tip coordinate calculating unit 154 performs calculation using the calculation result to obtain the coordinates (X, Y) of the tip position PO11 of the user's hand. Here, the coordinates (X, Y) may be coordinates on the clipped image or may be coordinates on the input image.

While it is possible to obtain a processing result quickly in a small processing amount by reducing the clipped images CP21 and performing the stereo-matching in this manner, an error is caused in an amount corresponding to the reduction, since the original clipped image CP21 is reduced.

Accordingly, an image around a tip position PO11' corresponding to the tip position PO11 is clipped as a vicinity image EP21 from the original clipped image CP21, and the correction stereo-matching unit 156 performs the stereo-matching on the left and right vicinity images EP21.

Here, the region of the vicinity image EP21 includes the tip position PO11' having coordinates (nX, nY), for example, and is a region configured from (n+α) pixels in the vertical direction and (n+α) pixels in the horizontal direction in FIG. 6. Here, α is a preliminarily determined optional value.

Since information indicating a parallax d in each region of the vicinity image EP21 is obtained by the stereo-matching of the vicinity images EP21, the touch coordinate calculating unit 68 performs processing similar to the processing in the tip coordinate calculating unit 154, and calculates the coordinates of a final touch position PO12. That is, the touch position PO12 is a position where the parallax d=D in the vicinity image EP21. By obtaining the coordinates of the tip position from the reduced image and obtaining the tip position (touch position) again from the original image in this manner, it is possible to obtain an accurate touch position in a small operation amount.

Figure 5:
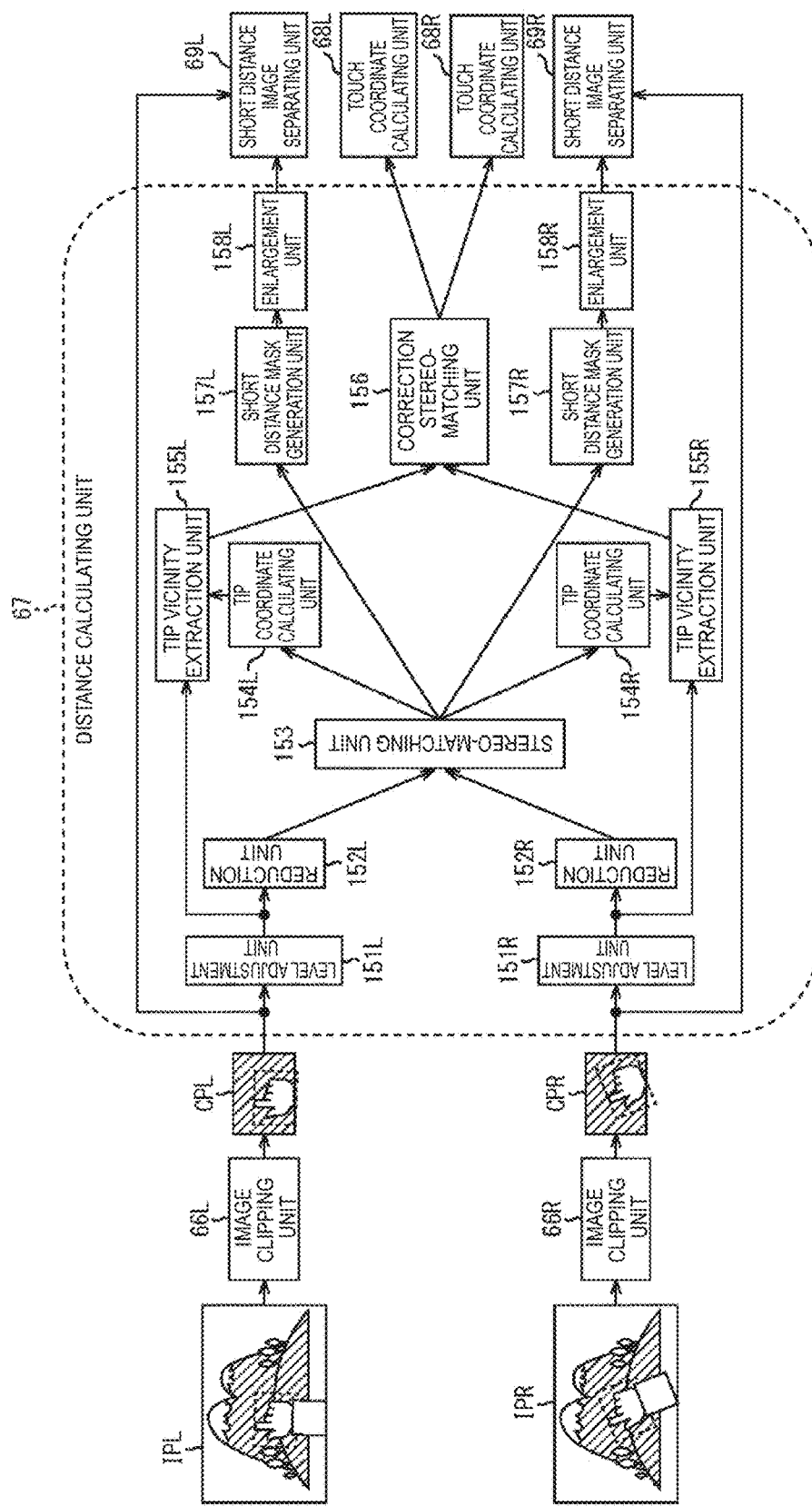
FIG. 5 is a diagram explaining processing in a distance calculating unit.

To return to the explanation of FIG. 5, a short distance mask generation unit 157L generates a mask image indicating an object region existing closer to the user side than the virtual image in the clipped image, based on the stereo-matching calculation result supplied from the stereo-matching unit 153, and supplies the mask image to an enlargement unit 158L.

For example, the short distance mask generation unit 157L extracts a region where the parallax d obtained by the stereo-matching is not smaller than the parallax D indicating the distance to the virtual image, from among the regions on the clipped image after the reduction, and generates an image indicating the region as the mask image. For example, the value (pixel value) of each of the regions in the mask image is determined to be 1 in a region where d≥D, and to be 0 in a region where d<D. The region where the parallax d is given by d≥D is a region of the object which is located closer (on the user side) than the virtual image in the three-dimensional space.

The enlargement unit 158L enlarges the mask image supplied from the short distance mask generation unit 157L to an image having the same size as the clipped image CPL, and supplies the enlarged mask image to the short distance image separating unit 69L. That is, the enlargement unit 158L enlarges the mask image in n times.

Further, the short distance mask generation unit 157R generates a mask image based on the stereo-matching calculation result supplied from the stereo-matching unit 153, and supplies the mask image to an enlargement unit 158R. The enlargement unit 158R enlarges the mask image supplied from the short distance mask generation unit 157R to an image having the same size as the clipped image CPR, and supplies the enlarged mask image to the short distance image separating unit 69R.

Note that, in the following, when the short distance mask generation unit 157L and the short distance mask generation unit 157R do not have to be distinguished in particular, each of them will be also simply called a short distance mask generation unit 157, and, when the enlargement unit 158L and the enlargement unit 158R do not have to be distinguished in particular, each of them will be also simply called an enlargement unit 158.

The short distance image separating unit 69 generates a short distance image based on the clipped image supplied from the image clipping unit 66 and the mask image supplied from the enlargement unit 158.

As above, the distance information indicating the distance to each of the objects on the clipped image is obtained by the level adjustment unit 151 to the enlargement unit 158 which are realized by the distance calculating unit 67, and further the touch coordinate information and the short distance image information are obtained from the distance information.

(Explanation of Touch Recognition Processing)

Next, with reference to the flowchart of FIG. 7, there will be explained touch recognition processing in which the display apparatus 11 displays the output image, and also recognizes a user's operation for the virtual image to perform processing according to the operation.

In step S11, the determination unit 121 determines a virtual image and the size, display position, and distance of the virtual image, and supplies information of the determined size and the like and the virtual image to the image clipping unit 66, the virtual image combining unit 123, and the display image combining unit 124, as needed. Note that, as described above, the display position and size of the virtual image are the display position and size on the output image, and the distance of the virtual image is the distance from the imaging unit 22 to the virtual image in the three-dimensional space.

For example, when the size and display position of the virtual image and the distance to the virtual image are determined preliminarily as initial values, the determination unit 121 determines the size, display position, and distance by reading the information from the ROM 62 via the bus 72.

Note that the size, display position and the like of the virtual image may be specified by the user, or may be corrected according to the parallax between the left and right input images. Further, the size and the like of the virtual image may be determined depending on a factor such as which of the left and right eyes of the user is used as a reference for the touch recognition of the virtual image. Further, when, out of the touch positions obtained from the clipped images for the right eye and the left eye, a button or the like on the virtual image is not touched at one touch position, the display position and the like of the virtual image may be determined according to the other touch position.

In step S12, the image clipping unit 66 clips a region which is determined by the display position and size of the virtual image supplied from the determination unit 121, from the input image supplied from the camera processing unit 65, and supplies the resultantly obtained clipped image to the level adjustment unit 151 and the short distance image separating unit 69.

In step S13, the distance calculating unit 67 performs distance measurement processing to measure the distance to each object on the clipped image. Note that, while details of the distance measurement processing will be described below, the parallax in each region on the clipped image is obtained and supplied to the touch coordinate calculating unit 68, and also the mask image is generated and supplied to the short distance image separating unit 69, in the distance measurement processing.

In step S14, the short distance image separating unit 69 separates the short distance image from the clipped image supplied from the image clipping unit 66 via the distance calculating unit 67 using the mask image supplied from the enlargement unit 158 of the distance calculating unit 67.

That is, out of the regions of the clipped image, a region of the object existing closer to the user side than the disposition position of the virtual image in the three-dimensional space is extracted to form a short distance image. For example, the short distance image is generated by means of obtaining a product of the clipped image and the mask image. The short distance image obtained in this manner is supplied to the virtual image combining unit 123 from the short distance image separating unit 69.

After the processing of step S14 has been performed, the process proceeds to step S18.

Further, in step S15, the touch coordinate calculating unit 68 calculates the coordinates of the user's touch position on the virtual image based on the stereo-matching result supplied from the correction stereo-matching unit 156 of the distance calculating unit 67, and supplies the touch position coordinates to the touch processing unit 122.

In step S16, the touch processing unit 122 determines whether or not the button or the like on the virtual image is touched, that is, whether or not the user has instructed to perform processing by touching a display position of the button or the like, based on the touch position coordinates supplied from the touch coordinate calculating unit 68.

Note that the user's touch position may be a center value or the like of the coordinates supplied from the touch coordinate calculating unit 68L and the coordinates supplied from the touch coordinate calculating unit 68R. Further, when the button or the like is not touched at a touch position obtained from the clipped image for the left eye, and the button or the like is touched at a touch position obtained from the clipped image for the right eye, a weight of the touch position obtained from the clipped image for the right eye may be increased and a final touch position may be obtained.

In step S16, when the button or the like is determined to be touched, the touch processing unit 122 causes each of the units in the display apparatus 11 to perform the processing according to the user's touch operation, in step S17.

For example, the processing according to the touch operation is image display, sound reproduction, or the like. Specifically, the touch processing unit 122 causes a display color to be changed such as causing a region of the virtual image touched by the user to become bright or causes sound specified by the touch operation to be reproduced. Further, while the output image is displayed by a flush or the color of the virtual image is changed, the display position of the virtual image may be moved back and forth.

After the processing according to the touch operation has been performed, the process proceeds to step S18. Further, when the button or the like is determined not to be touched in step S16, the processing of step S17 is not performed, and the process proceeds to step S18.

In this manner, in the display apparatus 11, the processing of step S14 and the processing of step S15 to step S17 are performed in parallel.

After the processing of step S14 has been performed and further it is determined that the processing of step S17 has been performed or the button or the like has not been touched in step S16, the processing of step S18 is performed.

In step S18, the virtual image combining unit 123 combines the short distance image from the short distance image separating unit 69 onto the virtual image from the determination unit 121, and supplies the combined image to the display image combining unit 124.

The short distance image is an image of the object existing closer to the user side than the virtual image in the three-dimensional space, in the clipped image which is obtained by clipping the vicinity of a region where the virtual image is displayed. Accordingly, when the virtual image superimposed on the input image is displayed, the short distance image becomes an image of the object on the input image which is hidden by the virtual image not to be seen although existing closer to the front side than the virtual image.

By causing the short distance image like this to be combined superimposed on the virtual image, even when the input image is superimposed on the virtual image, it becomes possible to prevent the object originally to be seen from becoming invisible, and to obtain a more real augmented reality image.

In step S19, the display image combining unit 124 combines the composite image supplied from the virtual image combining unit 123 onto a region on the input image which is determined by the display position and size of the virtual image supplied from the determination unit 121 to form an output image.

The display image combining unit 124 supplies the output image obtained in this manner to the image display unit 21 via the bus 88, the image display processing unit 86, and the image output unit 87, and causes the image display unit 21 to display the output image. Thereby, the user can view the output image which displays not only the actually existing object but also the virtual image, stereoscopically.

For example, an electronic book may be displayed on the output image as a virtual image, and a user may read the electronic book by performing operation on the virtual image. Further, a display screen of a multi-function phone may be displayed as a virtual image, and a user interface may be realized as if a user operates the multi-functional phone.

In step S20, the CPU 83 determines whether or not the process is to be terminated. When the process is determined not yet to be terminated in step S20, the process returns to step S11 and the above described processing is repeated.

On the other side, when the process is determined to be terminated in step S20, the touch recognition processing is terminated.

As above, the display apparatus 11 performs the distance calculation on the clipped image and recognizes the user's touch operation for the virtual image, performs the processing according to the recognition result, and also generates the output image for display.

By causing the virtual image to be displayed at an optional position and recognizing the touch operation for the virtual image based on the distance to the object in each region of the clipped image in this manner, it is possible to improve the operability of the display apparatus 11.

That is, since the disposition position of the virtual image is not restricted, a user interface having a higher freedom degree can be realized by the display apparatus 11. Further, by extracting an object region having the same distance as the distance to the virtual image and recognizing the touch operation, it is possible to perform the operation on the virtual image using an optional one, not limited to a hand or a foot, to improve the operability. Moreover, in this case, since the image recognition processing of a hand or the like is not necessary and the hand or the like is not necessary to be registered preliminarily, it is possible to realize a user interface having a higher freedom degree.

Further, in the display apparatus 11, since the processing is performed by the use of the left and right images, that is, by the use of two eyes, it is easy for the user to have a feeling of the distance to the virtual image displayed in the augmented reality space and not to feel stress in the operation for the virtual image.

(Explanation of the Distance Measurement Processing)

Subsequently, with reference to the flowchart of FIG. 8, there will be explained distance measurement processing corresponding to the processing of step S13 in FIG. 7.

In step S51, the level adjustment unit 151 performs the level adjustment of the clipped image supplied from the image clipping unit 66, and supplies the clipped image after the level adjustment to the reduction unit 152 and the tip vicinity extraction unit 155.

In step S52, the reduction unit 152 reduces the clipped image supplied from the level adjustment unit 151, and supplies the reduced clipped image to the stereo-matching unit 153.

In step S53, the stereo-matching unit 153 performs the stereo-matching based on the clipped image supplied from the reduction unit 152, and supplies the resultantly obtained parallax of each region in the clipped image to the tip coordinate calculating unit 154 and the short distance mask generation unit 157.

In step S54, the short distance mask generation unit 157 generates the mask image based on the parallax of each region in the clipped image supplied from the stereo-matching unit 153, and supplies the mask image to the enlargement unit 158.

Then, in step S55, the enlargement unit 158 enlarges the mask image supplied from the short distance mask generation unit 157, and supplies the enlarged mask image to the short distance image separating unit 69.

Further, after the processing of step S53 has been performed, in step S56, the tip coordinate calculating unit 154 calculates the coordinates of the tip position of the user's hand performing the touch operation, based on the calculation result of the stereo-matching supplied from the stereo-matching unit 153, and supplies the coordinates to the tip vicinity extraction unit 155.

In step S57, the tip vicinity extraction unit 155 clips a region in the vicinity of the tip position which is indicated by the coordinates supplied from the tip coordinate calculating unit 154, from the clipped image supplied from the level adjustment unit 151 to form a vicinity image, and supplies the vicinity image to the correction stereo-matching unit 156.

In step S58, the correction stereo-matching unit 156 performs the stereo-matching using the vicinity image from the tip vicinity extraction unit 155, and supplies the result to the touch coordinate calculating unit 68.

Figure 7:
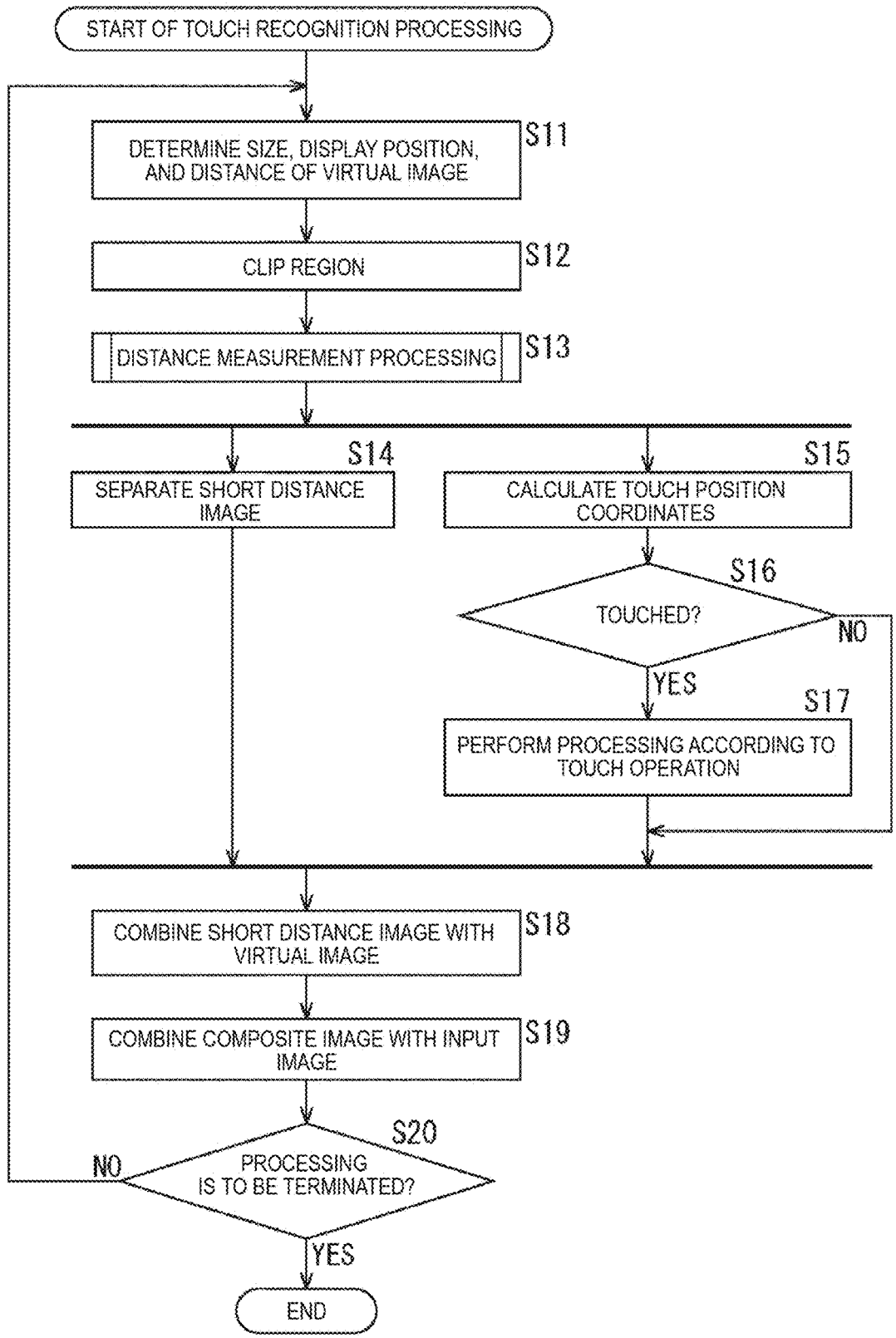
FIG. 7 is a flowchart explaining touch recognition processing.

After the processing in step S55 and step S58 has been performed in this manner, the distance measurement processing is terminated, and then the process proceeds to step S14 and step S15 in FIG. 7. Note that, in the distance measurement processing, the processing of step S54 and step S55 and the processing of step S56 to step S58 are performed in parallel.

As above, the display apparatus 11 performs the stereo-matching using the left and right clipped images, generates the mask image based on the calculation result, and also obtains the distance information (parallax information) for recognizing the user's touch position.

In this manner, in the distance calculating unit 67, the image processing such as the mask image generation for obtaining the short distance image and the processing for the touch recognition such as the stereo-matching processing of the clipped image having the original size are performed at the same time, and therefore it is possible to improve responsiveness of determination for the touch operation or the like. That is, it is possible to realize a user interface having a high freedom degree and an excellent responsiveness.

Further, since the matching processing such as the stereo-matching for the reduced clipped image is common processing in the processing for obtaining the short distance image and the processing for the touch recognition, the processing amount of the whole display apparatus 11 can be reduced and it is possible to realize a further higher responsiveness.

Moreover, since, in the display apparatus 11, the user's touch position is obtained by the use of the matching processing, it is not necessary to register the user's hand or the like preliminarily, but also it is not necessary to use a sensor or the like to detect the user's hand or the like. Therefore, it is possible to realize the display apparatus 11 by a simple configuration.

Modified Example 1 of the First Embodiment (Multi-Touch Recognition)

Figure 9:
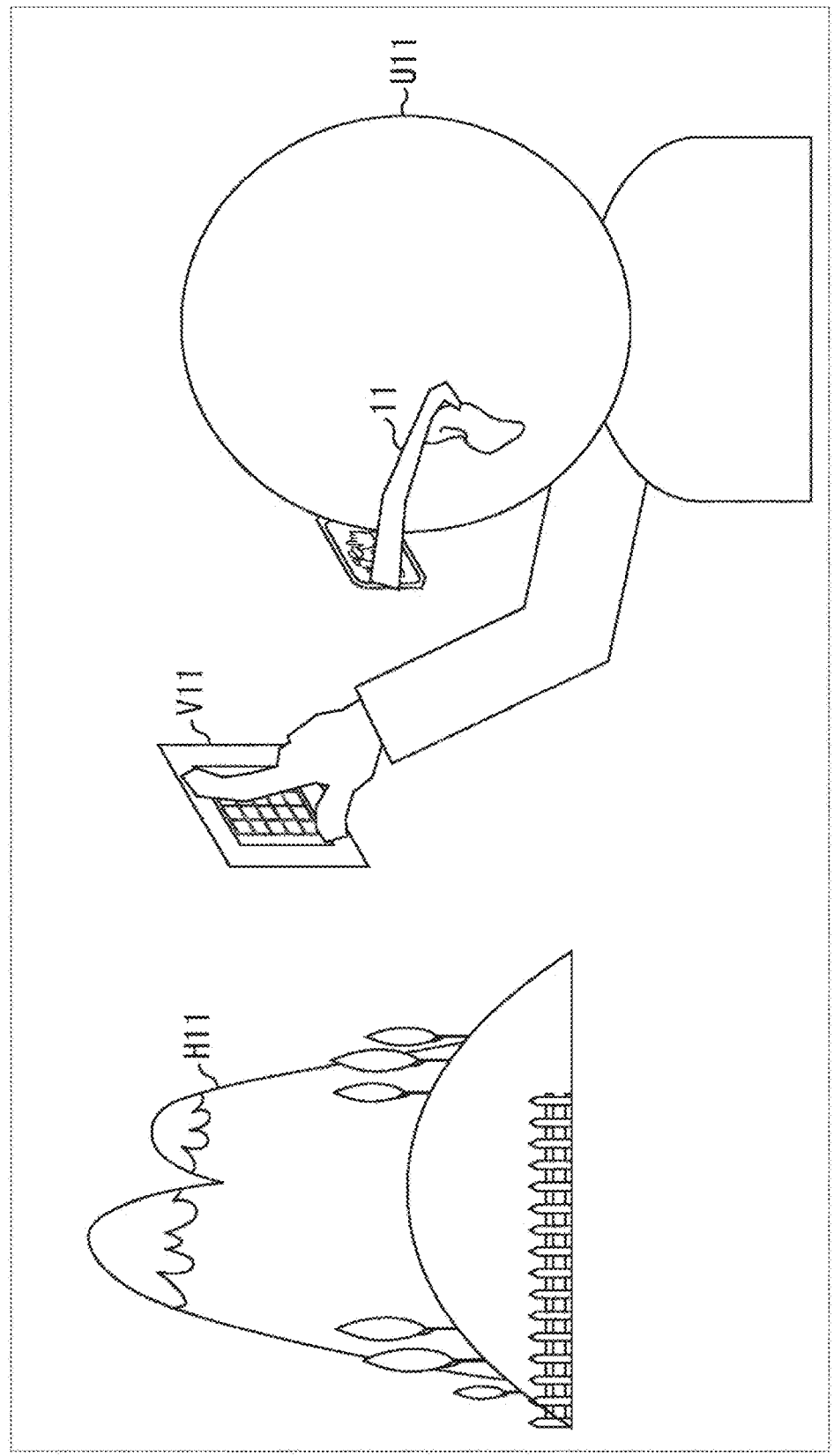
FIG. 9 is a diagram explaining multi-touch operation for a virtual image.

Note that, while, in the above, an example is explained for the case of the user's touch operation to one point on the virtual image, the touch operation may be performed by touching a plurality of points on the virtual image as shown in FIG. 9, for example. Here, in FIG. 9, the same sign is attached to a part corresponding to a part in FIG. 2, and the explanation thereof will be omitted appropriately.

In the example of FIG. 9, the user U11 touches different points on the virtual image V11 with two fingers of the index finger and the thumb of the right hand, respectively, and the display apparatus 11 recognizes these two touch positions to perform processing corresponding to the touch operation.

In this case, the same processing as the processing explained with reference to FIG. 7 is performed. Note that, one or a plurality of touch positions is detected corresponding to the user's touch operation in step S56 of FIG. 8, the vicinity image is generated for each of the touch positions in step S57, and the stereo-matching is performed on each of the vicinity images in step S58.

Then, in step S15 of FIG. 7, the coordinates of each of the touch positions are calculated, and, in step S17, the touch processing unit 122 controls the execution of the processing specified by the one or the plurality of touch positions. That is, the user's touch operation is recognized from a positional relationship of the plurality of touch positions or the change of the touch position, and the processing according to the operation is performed. Note that the touch coordinate calculating unit 68 adds an ID to each of the touch positions as needed so as to distinguish the touch positions.

By recognizing the multi-touch operation in this manner, it becomes possible to realize a user interface having a higher freedom degree.

Modified Example 2 of the First Embodiment (Virtual Image Display)

Figure 10:
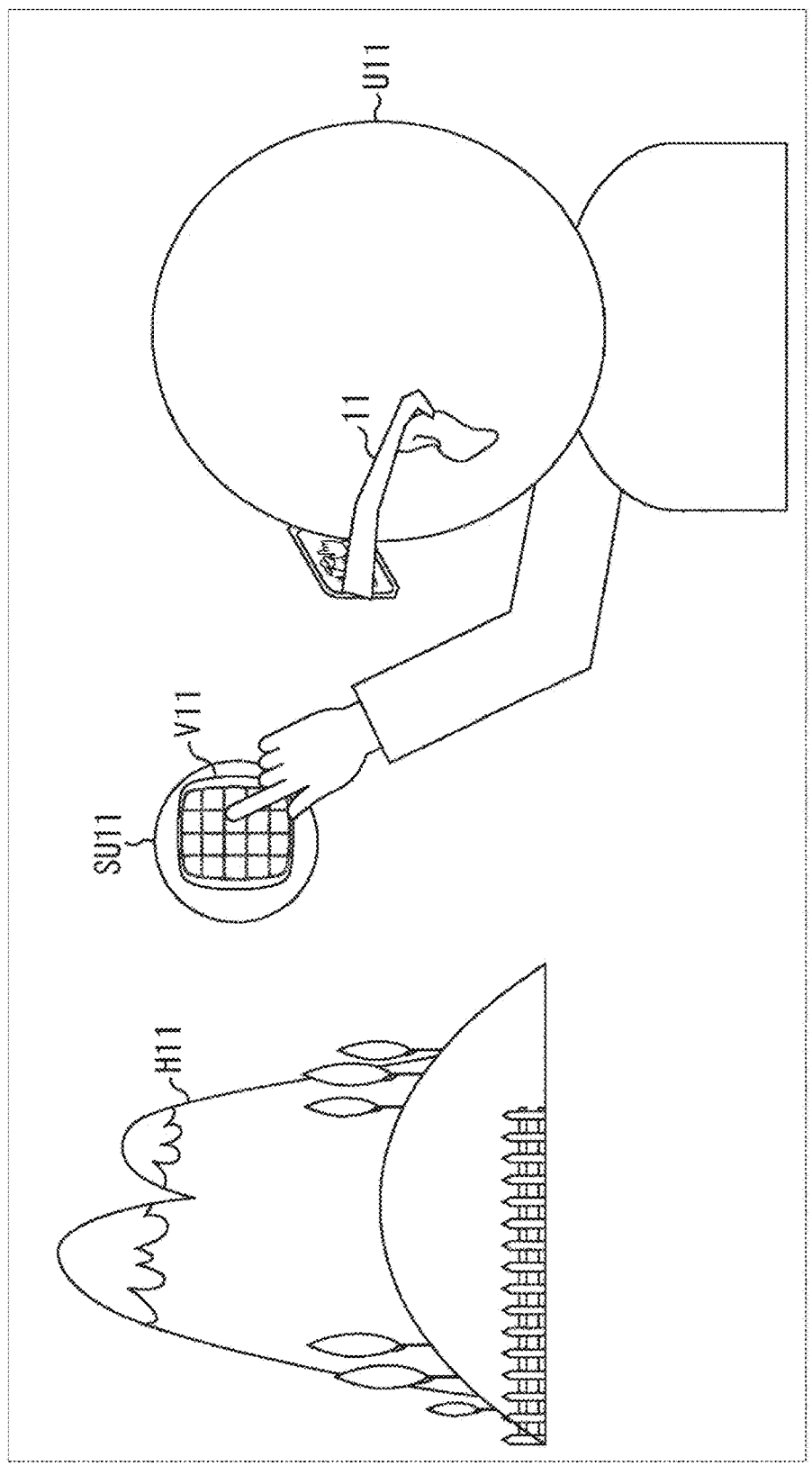
FIG. 10 is a diagram explaining display of virtual image to a non-flat plane.

Further, while, in the above, the case of displaying the virtual image on a flat plane is explained as one example, the virtual image may be displayed on a non-flat plane having a non-flat surface as shown in FIG. 10, for example, that is, on a non-flat plane such as a curved plane and a plane having unevenness or an inclination. Note that, in FIG. 10, the same sign is attached to a part corresponding to a part in FIG. 2, and the explanation thereof will be omitted appropriately.

In the example of FIG. 10, the virtual image V11 is displayed on a spherical plane SU11 in the three-dimensional augmented reality space, and the user U11 performs the touch operation on the virtual image V11 having a spherical shape.

Also in this case, the same processing as the touch recognition processing explained with reference to FIG. 7 is performed. Note that the distance of each region on the virtual image from the user (display apparatus 11) which is determined in step S11 is different for each region of the virtual image. That is, the distance to the virtual image is not constant but different for each region.

Figure 8:
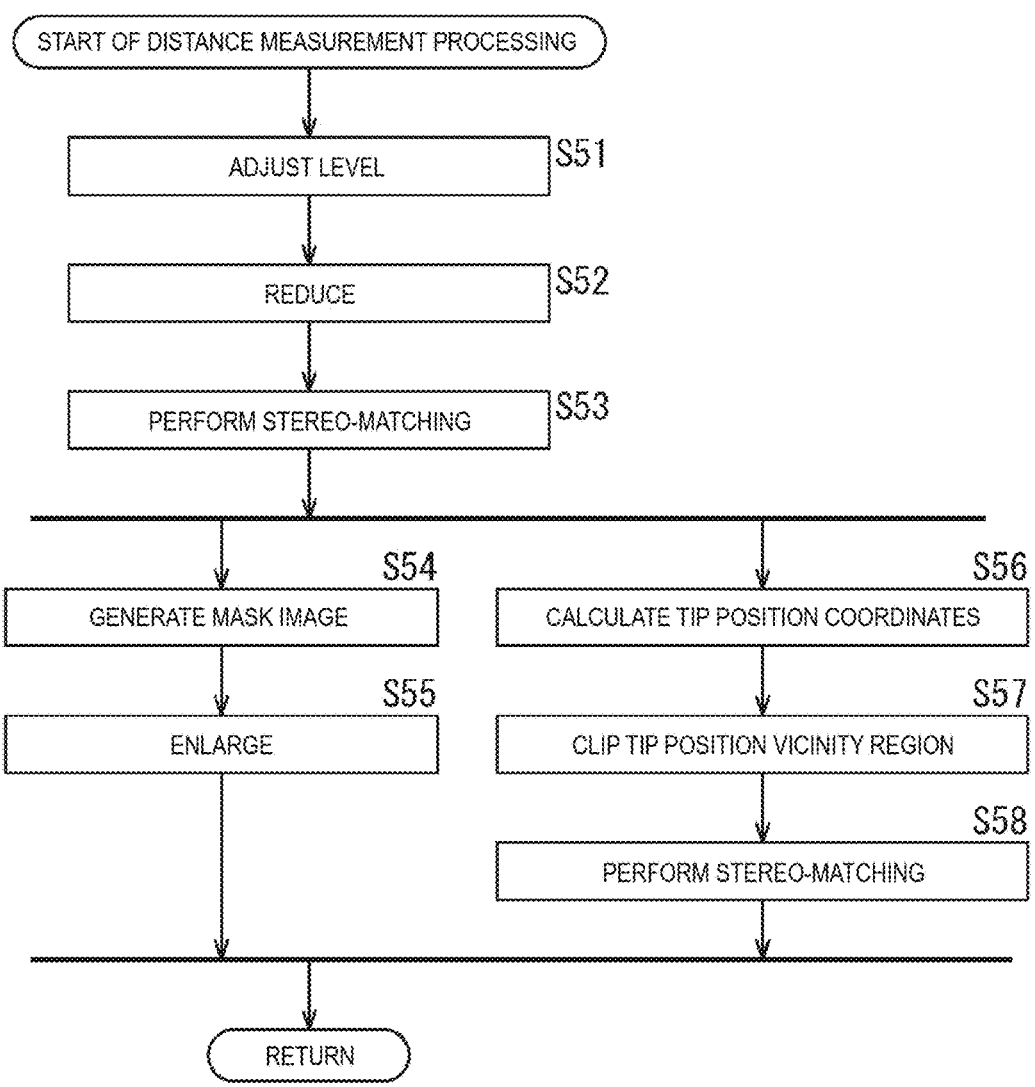
FIG. 8 is a flowchart explaining distance measurement processing.

Accordingly, in step S54 of FIG. 8, a different value of the parallax D indicating the distance of the virtual image is used for each region on the clipped image which corresponds to the virtual image to form a mask image. That is, the object existing closer to the user side than the non-flat plane where the virtual image is displayed is separated as the short distance image.

Further, in step S56 of FIG. 8, a different value of the parallax D is used for each region on the clipped image which corresponds to the virtual image to give the coordinates of the touch position. That is, the coordinates of the touch position are obtained based on a position in the clipped image at which a distance (parallax d) is the same as the distance to the virtual image determined by the parallax D.

Similarly, also in step S15 of FIG. 7, a different parallax D is used for each region on the clipped image to give the coordinates of the touch position.

Note that the parallax D indicating the distance from the imaging unit 22 to the virtual image in the three-dimensional space may be recorded preliminarily for each of the regions of the virtual image, or only the parallaxes D of some regions may be recorded preliminarily and the parallaxes D of the other regions may be obtained by an interpolation method.

By displaying the virtual image on the non-flat plane in this manner, it becomes possible to realize a user interface having a higher freedom degree. For example, when the virtual image is displayed on a spherical plane, it becomes possible to realize a more diversified user interface, such that the user can display a button or the like of the virtual image which has been invisible so far, by rotating the spherical plane with the touch operation.

Modified Example 3 of the First Embodiment (Virtual Image Display)

Figure 11:
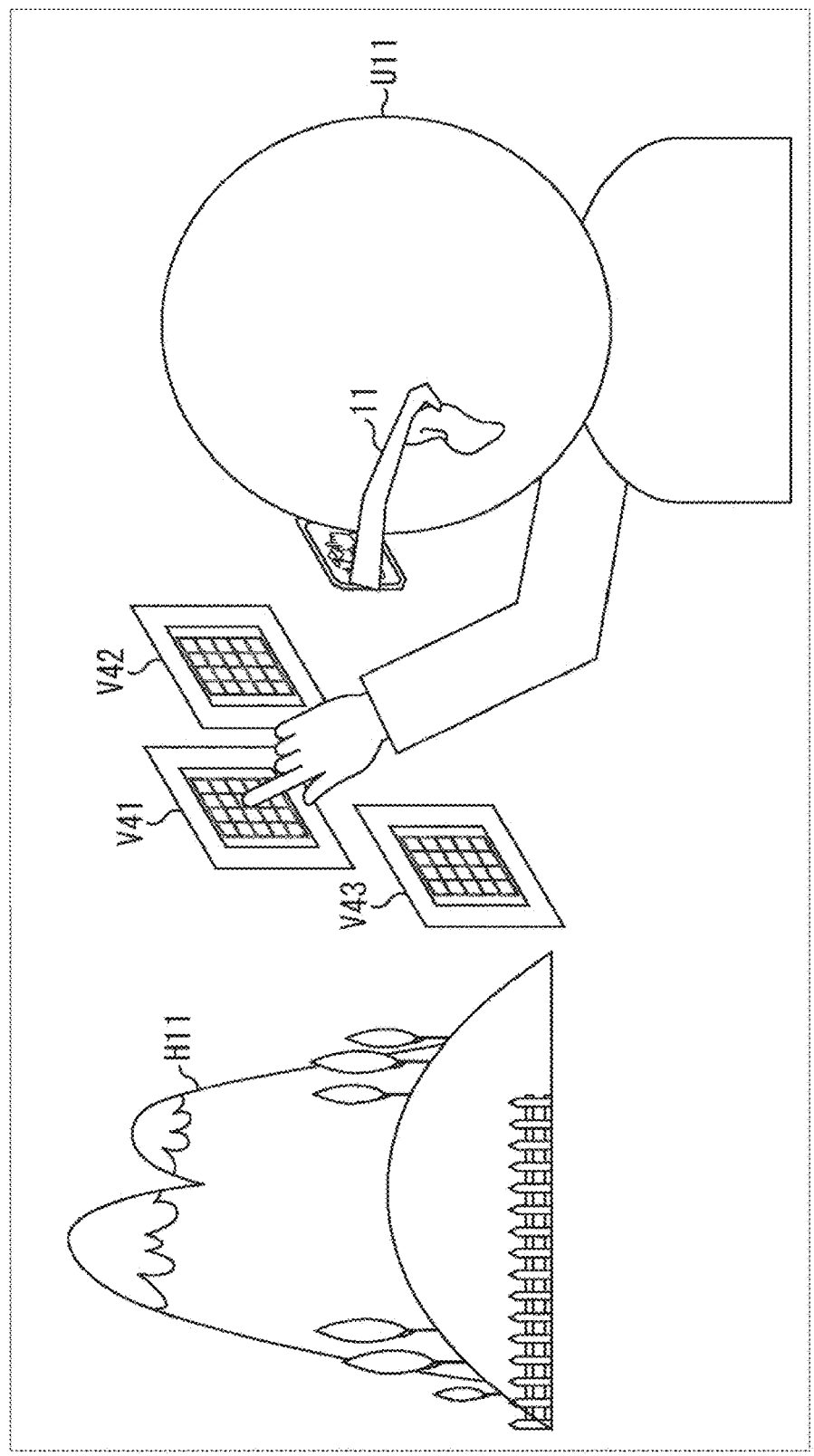
FIG. 11 is a diagram explaining display of a plurality of virtual images.

Further, while, in the above, the case of displaying one virtual image is explained, a plurality of virtual images may be displayed as shown in FIG. 11, for example. Note that, in FIG. 11, the same sign is attached to a part corresponding to a part in FIG. 2, and the explanation thereof will be omitted appropriately.

In the example of FIG. 11, three virtual images V41 to V43 are displayed in the augmented reality space, that is, on the output image, and the user U11 performs the touch operation on the virtual image V41 which is one of the virtual images.

The display apparatus 11 recognizes the user's touch operation for these virtual images V41 to V43, and performs processing according to the touch operation.

In this case, the same processing as the touch recognition processing explained with reference to FIG. 7 is performed. Note that, in this case, each of the virtual images has an individual ID, the processing of step S11 to step S18 is performed independently for each of the displayed virtual images, a composite image obtained from each of the virtual images is combined with the input image in step S19 to form an output image.

Accordingly, in this case, the user U11 can perform the touch operation individually for each of the virtual images.

By displaying the plurality of virtual images in this manner, it becomes possible to realize a user interface having a higher freedom degree.

(Another Exemplary Configuration of the Display Apparatus)

Figure 12:
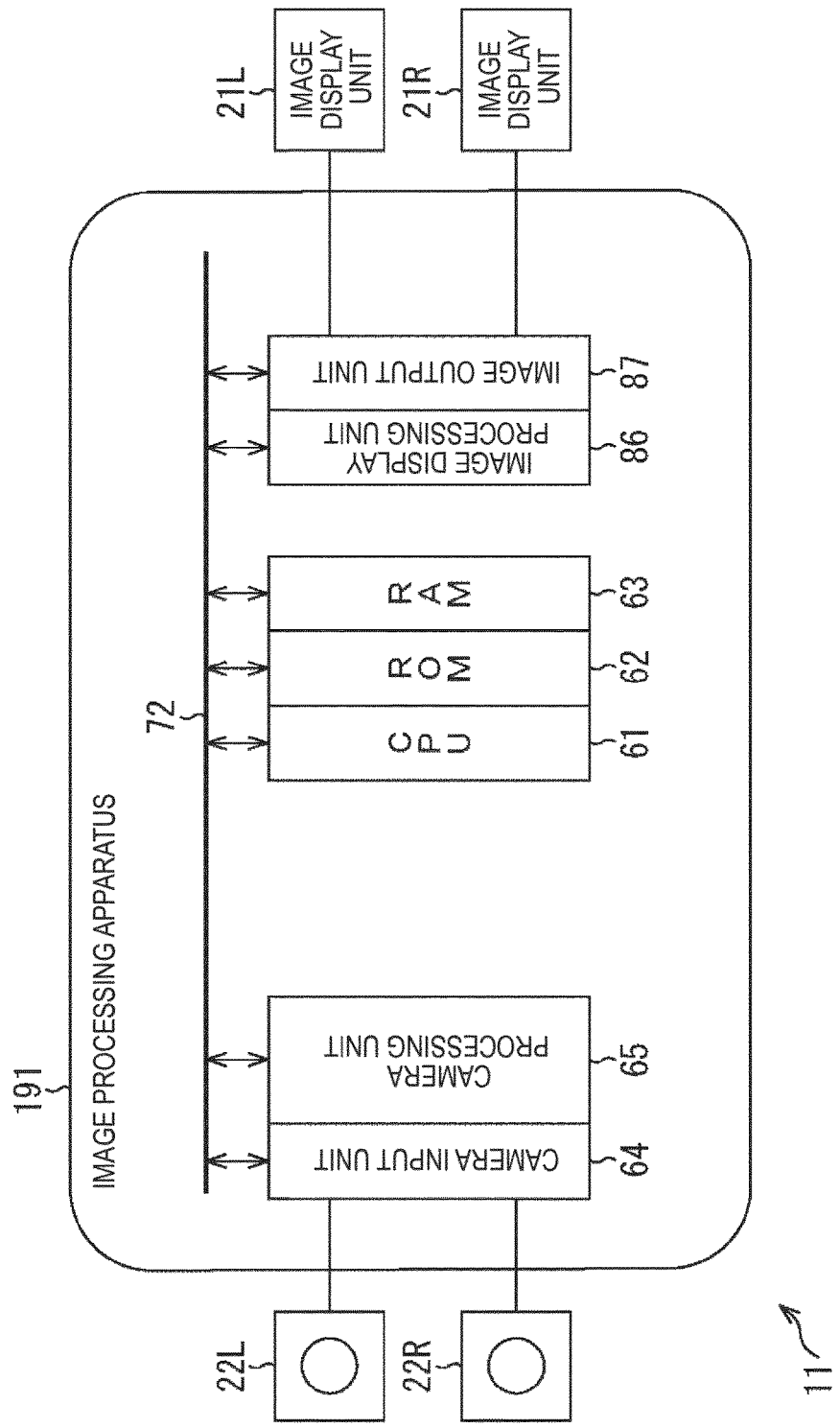
FIG. 12 is a diagram illustrating another exemplary configuration of a display apparatus.

Further, while, in the above, the case of configuring the display apparatus 11 from the image processing apparatus 51 and the image display processing apparatus 52 as shown in FIG. 3 is explained, any other configurations may be used. For example, the display apparatus 11 may be configured as shown in FIG. 12. Note that, in FIG. 12, the same sign is attached to a part corresponding to a part in FIG. 3, and the explanation thereof will be omitted appropriately.

The display apparatus 11 shown in FIG. 12 is configured from the imaging unit 22L, the imaging unit 22R, an image processing apparatus 191, the image display unit 21L, and the image display unit 21R.

In this example, the image processing apparatus 191 is configured from the CPU 61, the ROM 62, the RAM 63, the camera input unit 64, the camera processing unit 65, the image display processing unit 86, the image output unit 87, and the bus 72. Then, these CPU 61 to image output unit 87 are mutually connected via the bus 72.

Figure 4:
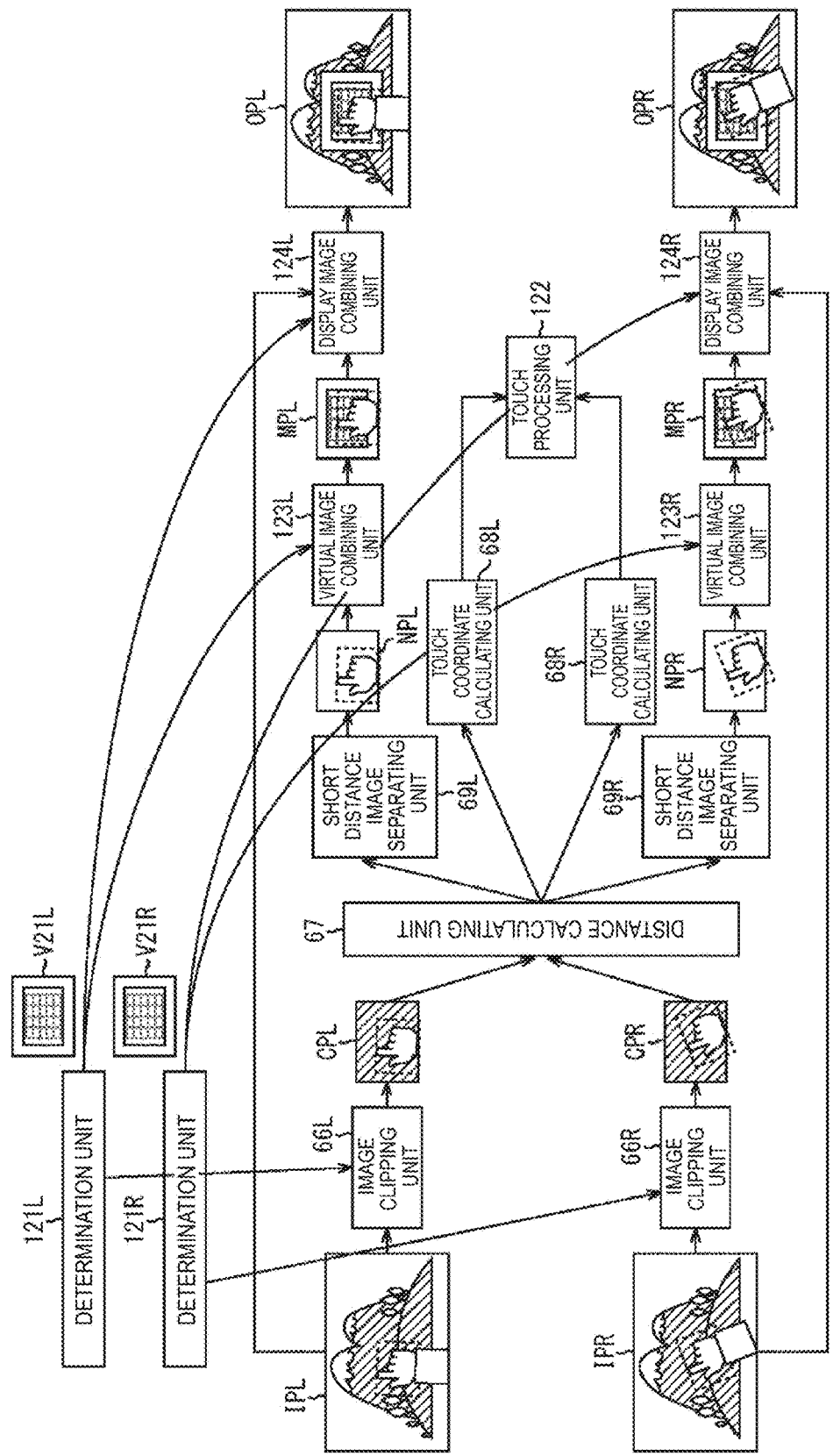
FIG. 4 is a diagram explaining a processing flow by a display apparatus.

In the image processing apparatus 191, the CPU 61 executes a program recorded in the ROM 62, to realize the image clipping unit 66 to the short distance image separating unit 69 shown in FIG. 3, the touch processing unit 122 to the display image combining unit 124 shown in FIG. 4, and the like. Note that the camera processing unit 65 may perform the processing such as the image clipping.

Second Embodiment (Correction of the Virtual Image Display Position)

Figure 13:
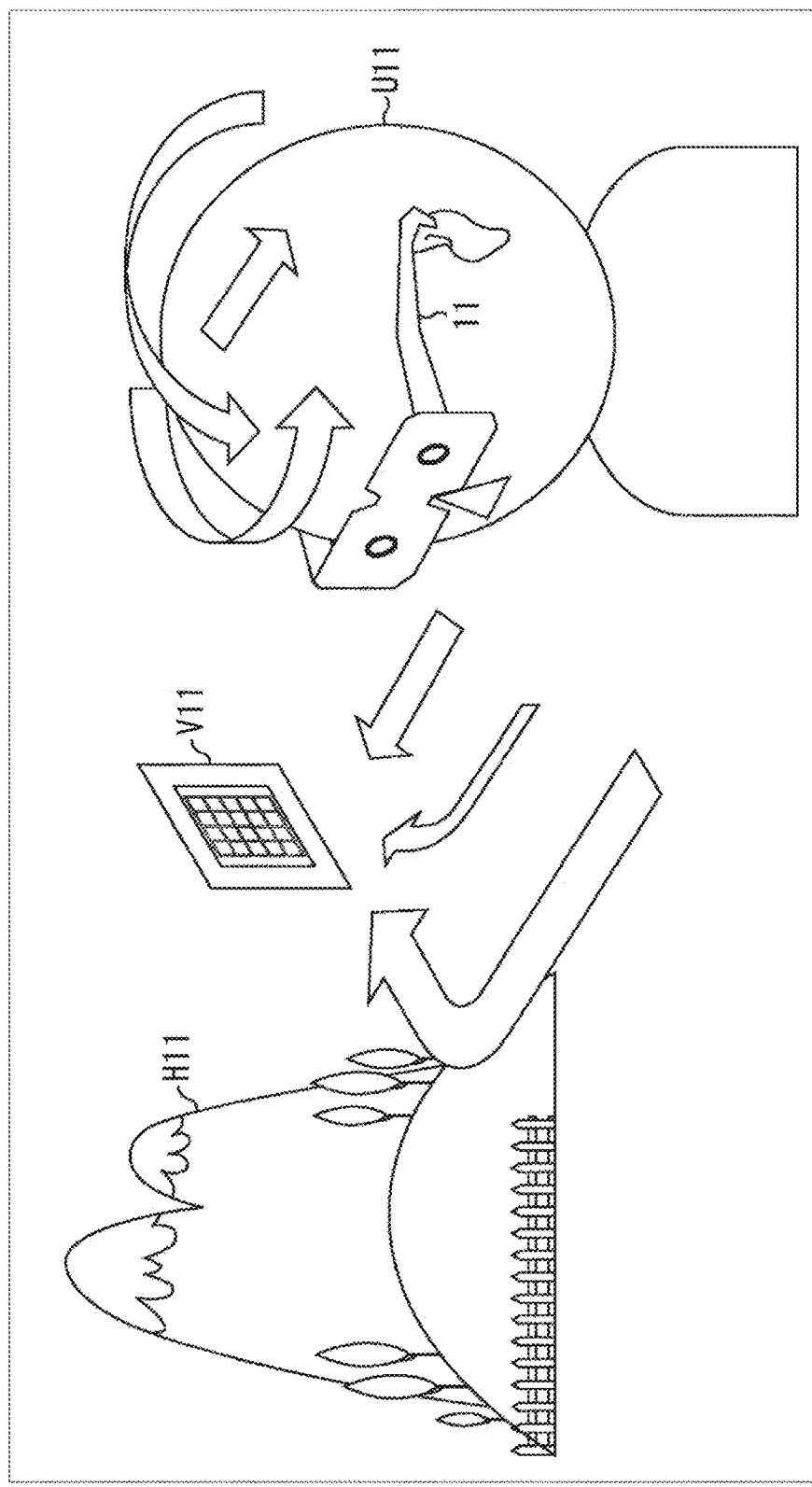
FIG. 13 is a diagram explaining a motion of a user who wears a display apparatus.

Meanwhile, the display position of the virtual image V11 is assumed to be fixed in the augmented reality space as shown in FIG. 13, and the user U11 is assumed to move the head in a state of wearing the display apparatus 11. Note that, in FIG. 13, the same sign is attached to a part corresponding to a part in FIG. 2, and the explanation thereof will be omitted appropriately.

In the case that the display position of the virtual image V11 is fixed in this manner, when the user U11 moves the head, the combining position of the virtual image V11 on the output image and the position of the virtual image V11 in the actual augmented reality space are shifted from each other.

Figure 14:
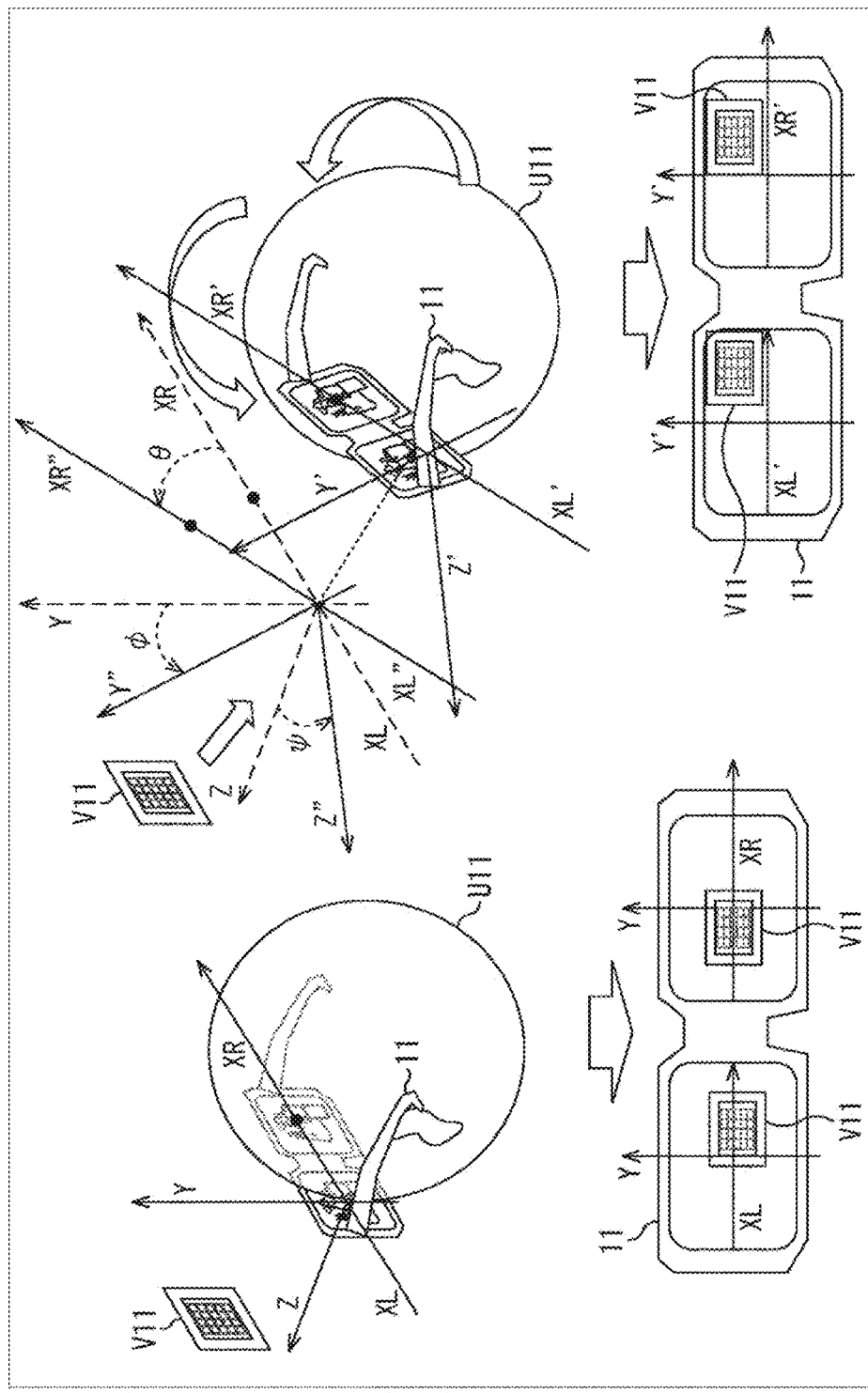
FIG. 14 is a diagram explaining a display coordinate system and display position correction of a virtual image.

Specifically, as shown in FIG. 14 on the left side, for example, respective display coordinate systems are assumed to be determined based on the imaging unit 22L and the imaging unit 22R of the display apparatus 11. That is, in FIG. 14 on the left side, the right obliquely upward direction is defined as an XL-axis direction or an XR-axis direction, and, in FIG. 14, the upward direction is defined as a Y-axis direction and the left obliquely upward direction is defined as a Z-axis direction.

The display coordinate system based on the imaging unit 22L (in the following, also called an L display coordinate system) is a coordinate system having an origin at a point having a preliminarily determined positional relationship with the imaging unit 22L, and this L display coordinate system is a three-dimensional coordinate system having the XL-axis, the Y-axis, and the Z-axis as axes.

Further, the display coordinate system based on the imaging unit 22R (in the following, also called an R display coordinate system) is a coordinate system having an origin at a point having a preliminarily determined positional relationship with the imaging unit 22R, and this R display coordinate system is a three-dimensional coordinate system having the XR-axis, the Y-axis, and the Z-axis as axes.

Here, when the display position, size and distance of the virtual image V11 is specified in the display coordinate system, for example, the virtual image V11 is displayed on the output image corresponding to the display position, size, and distance thereof. When the head of the user U11 is moved as shown in FIG. 14 on the right side, however, the display coordinate system for the three-dimensional real space changes according to the change of the head, that is, the change of the position, direction, and inclination change of the display apparatus 11.

In this example, when the axes of the L display coordinate system after the head movement is defined as an XL'-axis, a Y'-axis, and a Z'-axis, the XL-axis is rotated by an angle $\theta$ to become an XL"-axis, the Y-axis is rotated by an angle $\phi$ to become a Y"-axis, and the Z-axis is rotated by an angle $\psi$ to become a Z"-axis. For the R display coordinate system, similarly, the XR-axis, the Y-axis, and the Z-axis are rotated by an angle $\theta$, an angle $\phi$, and an angle $\psi$ to become an XR"-axis, a Y"-axis, and a Z"-axis, respectively.

Moreover, the XL"-axis, the Y"-axis, and the Z"-axis are moved in parallel to become the XL'-axis, the Y'-axis, and Z'-axis which are the axes of the L display coordinate system after the head movement. Further, the XR"-axis, the Y"-axis, and the Z"-axis are moved in parallel to become the XR'-axis, the Y'-axis, and the Z'-axis which are axes of the R display coordinate system after the head movement.

When the display coordinate system is changed in the three-dimensional real space in this manner, it is necessary to move the display position of the virtual image V11 which has been located approximately in the center of the output image as shown in FIG. 14 on the left lower side, for example, according to the head movement of the user U11, as shown in FIG. 14 on the right lower side. In the example shown in FIG. 14 on the right lower side, the virtual image V11 is moved in the right upward direction on the output image.

Accordingly, by providing the display apparatus 11 with a function of detecting the direction (direction and inclination) and position change of the user U11, that is, the display apparatus 11, and correcting the display position and size of the virtual image V11 in the output image according to the detection result, it is possible to realize a real augmented reality such as fixing the virtual image in the space.

(Exemplary Configuration of the Display Apparatus)

Figure 15:
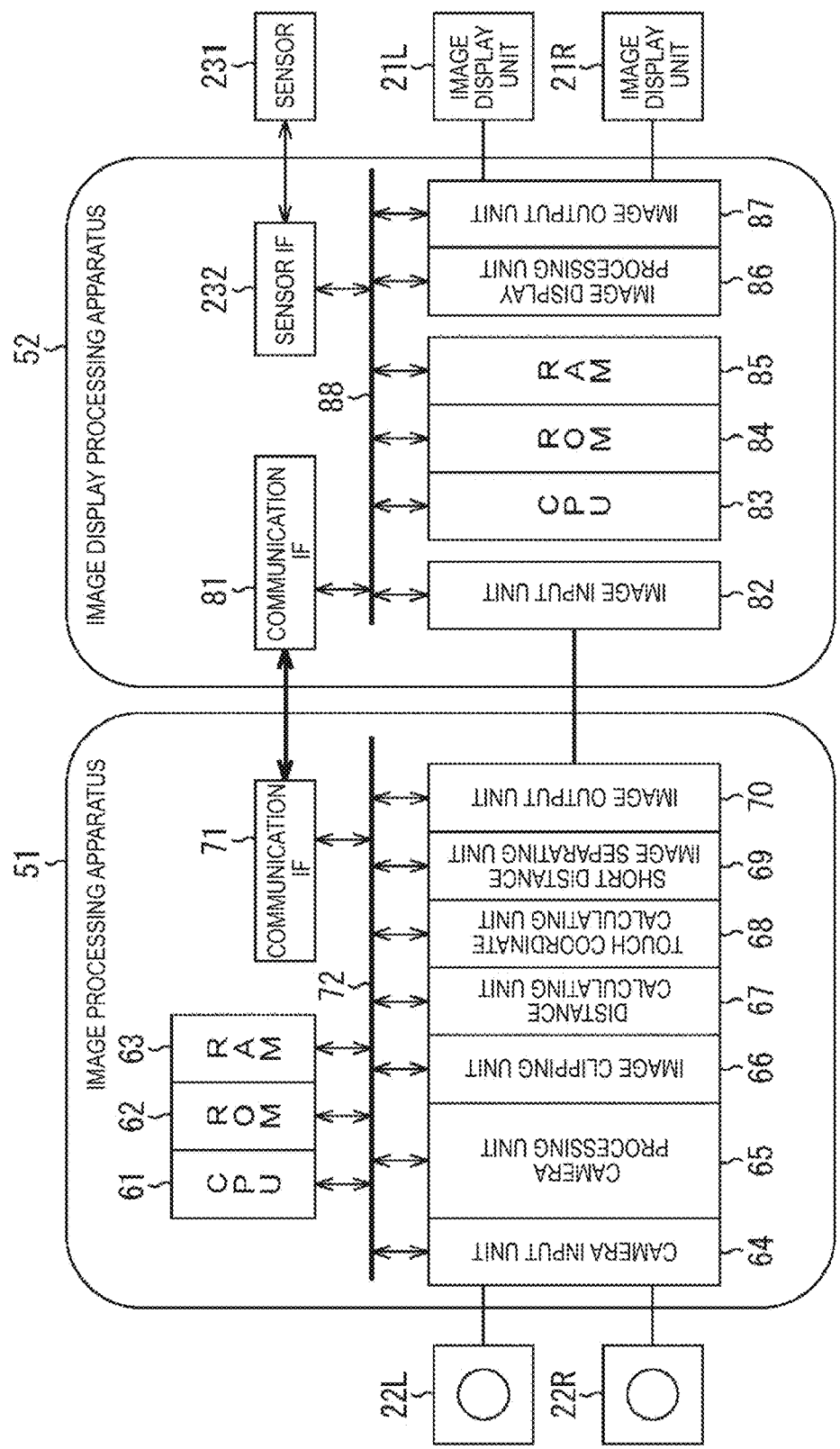
FIG. 15 is a diagram illustrating an exemplary configuration of a display apparatus.

When the correction function for the display position and the like of the virtual image is to be provided in this manner, the display apparatus 11 is configured as shown in FIG. 15, for example. Note that, in FIG. 15, the same sign is attached to a part corresponding to a part in FIG. 3, and the explanation thereof will be omitted appropriately.

The display apparatus 11 shown in FIG. 15 is different from the display apparatus 11 shown in FIG. 3 in the point that a sensor 231 and a sensor IF 232 are newly provided, and the other configuration is the same as the configuration of the display apparatus 11 shown in FIG. 3.

In FIG. 15, the sensor IF 232 is provided in the image display processing apparatus 52, and the sensor 232 is connected to the bus 88. Further, the sensor 231 is configured from a six-axis sensor or the like, for example, and detects a change of the position and a change of the direction (direction and inclination) in the display apparatus 11, and outputs the detection result to the sensor IF 232.

(Explanation of Display Position Correction Processing)

Figure 16:
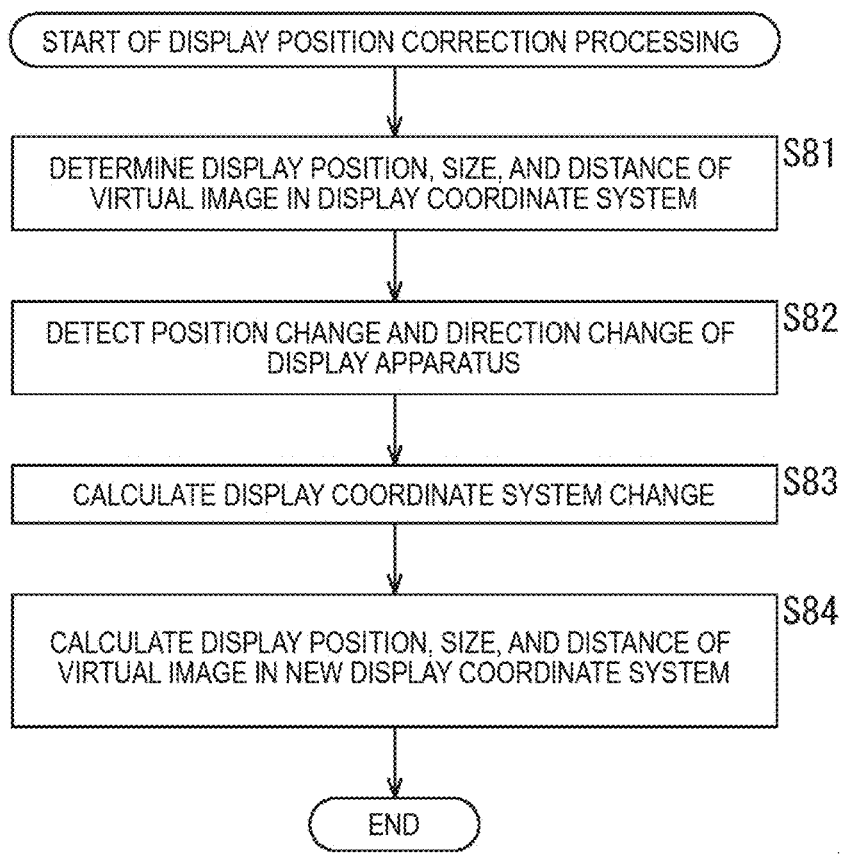
FIG. 16 is a flowchart explaining display position correction processing.

Next, with reference to the flowchart of FIG. 16, there will be explained display position correction processing which is processing of detecting the user movement and correcting the display position and the like of the virtual image in the display apparatus 11 shown in FIG. 15.

In step S81, for the virtual image in the three-dimensional space, the determination unit 121 determines the display position, size, and distance of the virtual image and the virtual image in the display coordinate system of the display apparatus 11. Note that this processing corresponds to the processing of step S11 in FIG. 7, and the display position and size of the virtual image in the display coordinate system is the display position and size of the virtual image on the output image. Further, the distance of the virtual image in the display coordinate system is the distance from the virtual image to the imaging unit 22.

In step S82, the sensor 231 detects the position change and the direction change of the display apparatus 11, and supplies the detection result to the sensor IF 232.

In step S83, the CPU 83 calculates the change of the display coordinate system based on the position and direction changes of the display apparatus 11 supplied from the sensor IF 232 via the bus 88.

In step S84, the CPU 83 calculates the display position, size, and distance of the virtual image in a new display coordinate system based on the calculation result of the change in the display coordinate system and the display position, size, and distance of the virtual image determined in step S81.

That is, while the position and the like of the virtual mage in the three-dimensional space are kept to be fixed, the display position, size, and distance of the virtual image viewed from the new display coordinate system are calculated according to the change of the display coordinate system, and thereby the display position, size, and distance of the virtual image are corrected.

The CPU 83, after having calculated the display position, size, and distance of the virtual image in the new display coordinate system, supplies the calculation result to the CPU 61 via the communication IF 81 and the communication IF 71, and terminates the display position correction processing.

The determination unit 121 which is realized by the CPU 61 uses the calculation result supplied from the CPU 83 as a new display position, size, and distance of the virtual image. In this manner, after the display position and the like have been corrected according to the user's movement, the touch recognition processing shown in FIG. 7 is performed using the display position and the like after the correction. Note that the calculation of the new display position and the like of the virtual image based on the output of the sensor 231 may be performed by the CPU 83, or by the CPU 61.

As above, the display apparatus 11 detects the position and direction changes of the display apparatus 11, and corrects the display position and the like of the virtual image based on the detection result. By correcting the display position and the like of the virtual image according to the movement of the display apparatus 11 in this manner, it is possible to form the virtual image displayed as if fixed at a specific position in the augmented reality space, and to realize a more real augmented reality.

Note that, while, in this example, the example of correcting (re-calculating) the display position, size, and distance of the virtual image is explained, the CPU 83 or the like also may newly obtain and correct the shape of the virtual image displayed on the output image based on the calculation result of the change in the display coordinate system.

Third Embodiment (Display Position Adjustment of the Virtual Image)

Further, while, in the above, the case of determining the display position and the like of the virtual image on the side of the display apparatus 11 is explained as one example, the display position and the like of the virtual image may be adjusted by the user optionally.

Figure 17:
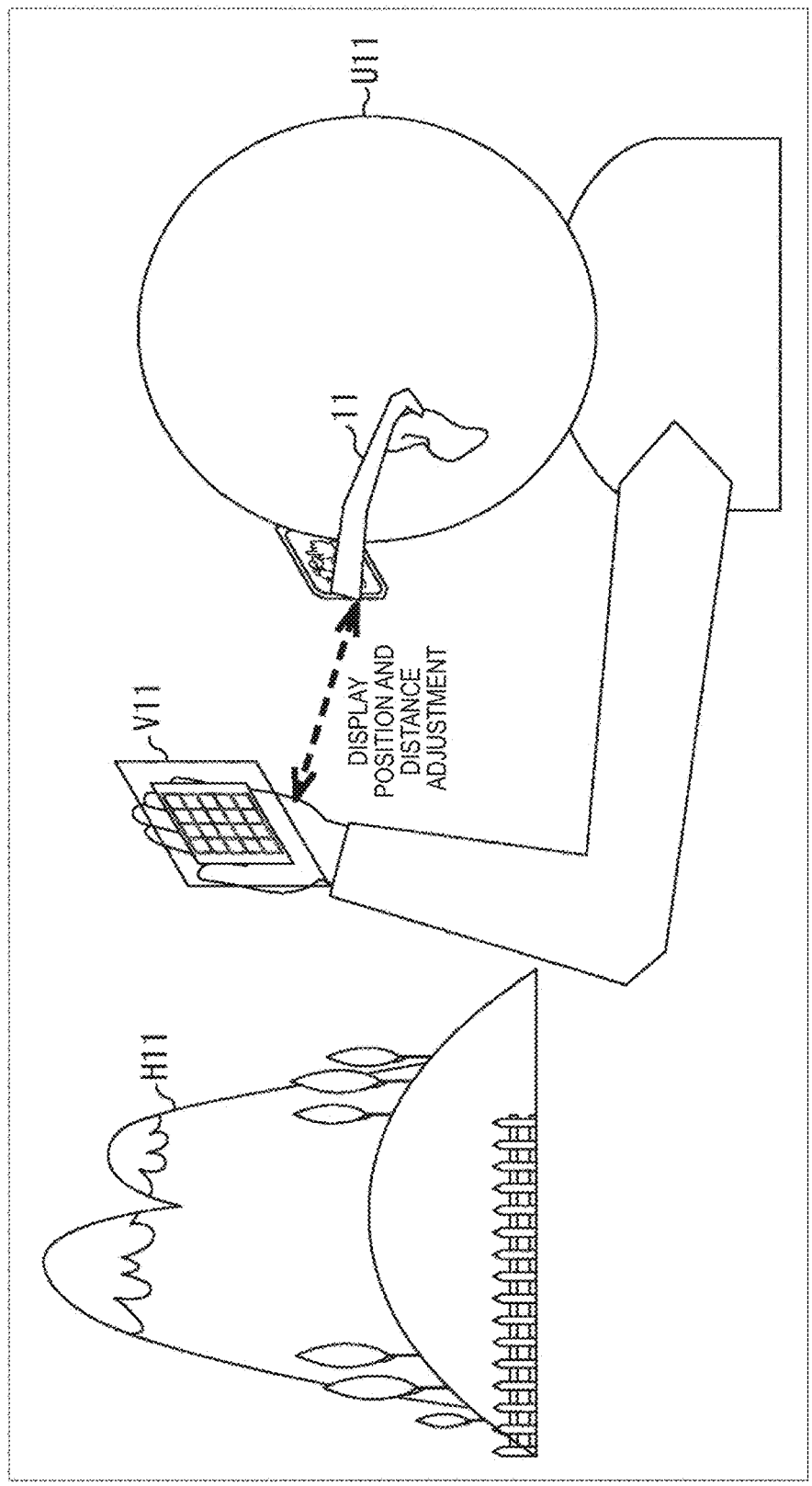
FIG. 17 is a diagram explaining display position adjustment and initial position determination of a virtual image.

In such a case, for example as shown in FIG. 17, the user adjusts the display position, distance and the like of the virtual image using a user's palm. Note that, in FIG. 17, the same sign is attached to a part corresponding to a part in FIG. 2, and the explanation thereof will be omitted appropriately.

In the example of FIG. 17, the virtual image V11 is displayed at a position of the left palm of the user U11. The user U11 adjusts the display position and the like of the virtual image V11 by moving the left palm up and down, and back and forth.

Figure 18:
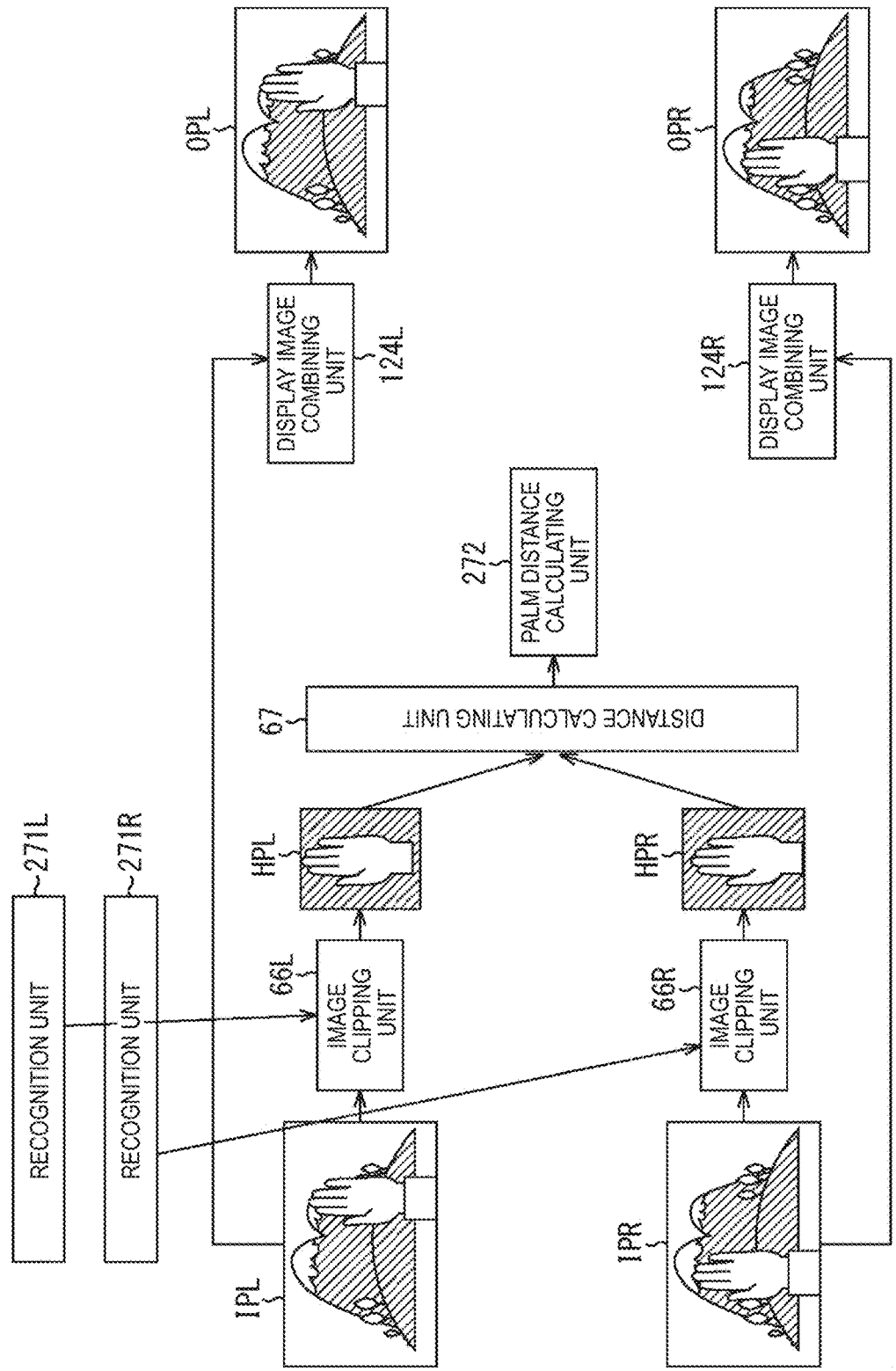
FIG. 18 is a diagram explaining a processing flow in display position adjustment and initial position determination of a virtual image.

When the display position of the virtual image is adjusted by the palm in this manner, the display apparatus 11 shown in FIG. 3 determines the display position, size, and distance of the virtual image by performing the processing shown in FIG. 18. Note that, in FIG. 18, the same sign is attached to a part corresponding to a part in FIG. 4, and the explanation thereof will be omitted appropriately.

In the example shown in FIG. 18, first a recognition unit 271L and a recognition unit 271R detect the palm from the left input image IPL and the right input image IPR. For example, the recognition unit 271L and the recognition unit 271R are realized by the CPU 83, and the recognition unit 271L and the recognition unit 271R obtain the input images from the camera processing unit 65 via the bus 88, the image input unit 82, the image output unit 70, and the bus 72.

After having detected the user's palm from the input images, the recognition unit 271L and the recognition unit 271R supply the positions of the palm and sizes of vicinity regions including the palm region to the image clipping unit 66L and the image clipping unit 66R. Note that, in the following, when the recognition unit 271L and the recognition unit 271R do not have to be distinguished in particular, each of them will be also simply called a recognition unit 271.

The image clipping unit 66L and the image clipping unit 66R clip the palm regions from the left input image IPL and the right input image IPR to form a clipped image HPL and a clipped image HPR based on the position of the palm and the size of the vicinity region from the recognition units 271, and supplies these images to the distance calculating unit 67.

The distance calculating unit 67 performs the stereo-matching based on the left and right clipped images supplied from the image clipping units 66, and supplies the calculation result to a palm distance calculating unit 272. The palm distance calculating unit 272 obtains the position of the palm and the distance from the imaging unit 22 (display apparatus 11) to the palm based on the calculation result of the stereo-matching supplied from the distance calculating unit 67. The determination unit 121 determines the display position, size, and distance of the virtual image based on the position and distance of the palm obtained in this manner.

Note that the palm distance calculating unit 272 is realized by the CPU 61, for example. Further, in the display image combining unit 124, the left input image IPL and the right input image IPR are displayed on the image display units 21 without change as the output image.

Further, while the example of adjusting the display position and the like of the virtual image by the user using the palm is explained here, the recognition target to adjust the display position and the like of the virtual image is not limited to the palm, and anything may be used such as an optional part of a user's body.

(Obstacle Detection)

Figure 19:
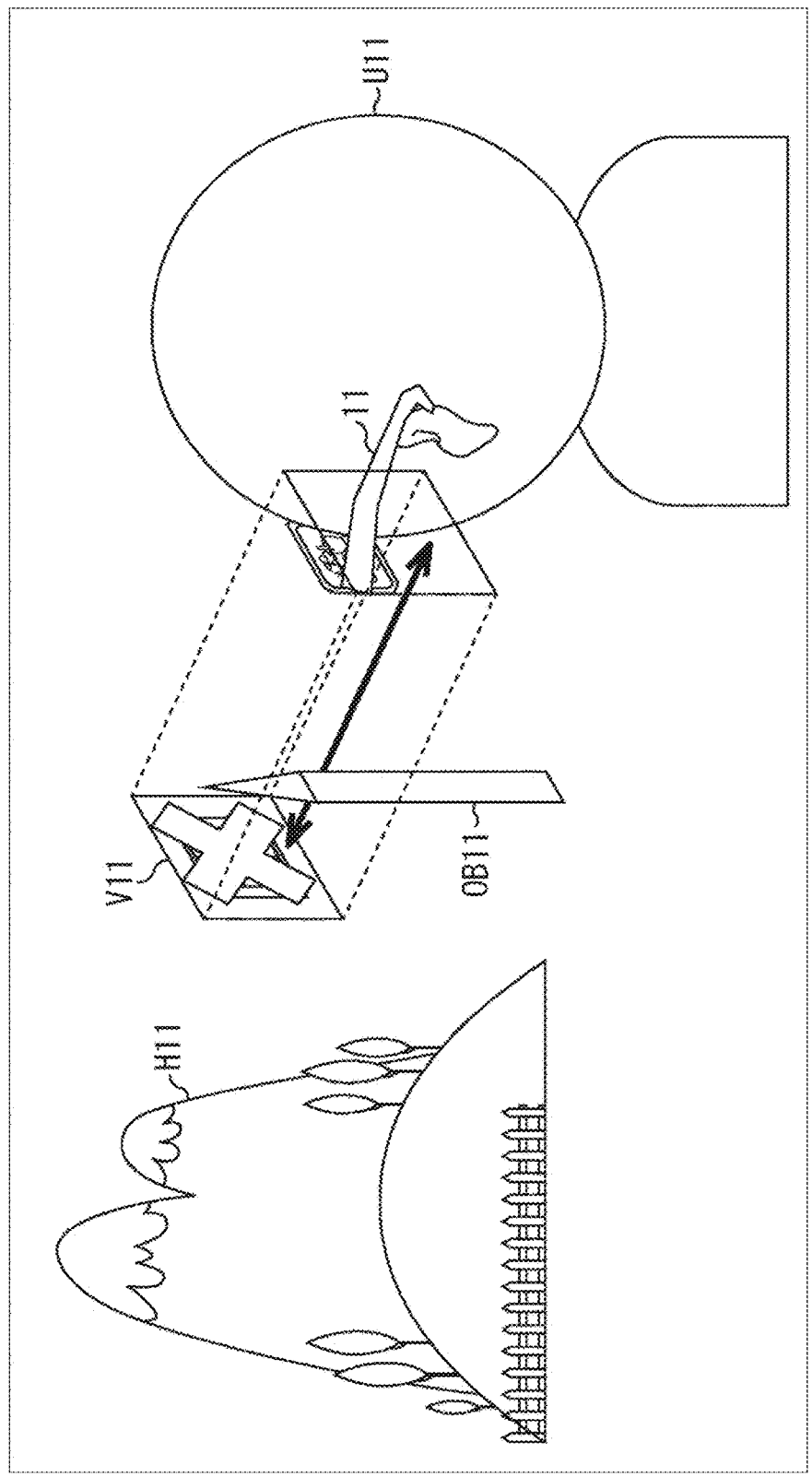
FIG. 19 is a diagram explaining obstacle detection.

Moreover, when the user performs the touch operation for the virtual image and an obstacle OB11 exists between the virtual image V11 and the user U11 as shown in FIG. 19, for example, sometimes the hand of the user U11 hits the obstacle OB11. Note that, in FIG. 19, the same sign is attached to a part corresponding to a part in FIG. 2, and the explanation thereof will be omitted appropriately.

In this example, since also the obstacle OB11 is imaged by the display apparatus 11, the user U11 can recognize the obstacle OB11 on the output image and can perform the touch operation by avoiding the obstacle OB11. From the viewpoint of safety, however, preferably the obstacle OB11 does not exist between the virtual image V11 and the user U11.

Accordingly, the display apparatus 11 may be provided with a function of detecting whether or not the obstacle OB11 exists between the virtual image V11 and the display apparatus 11 and controlling the display of the virtual image V11 depending on the detection result. In the example of FIG. 19, an image of an X-mark is displayed superimposed on the virtual image V11 as an image to attract attention.

Figure 20:
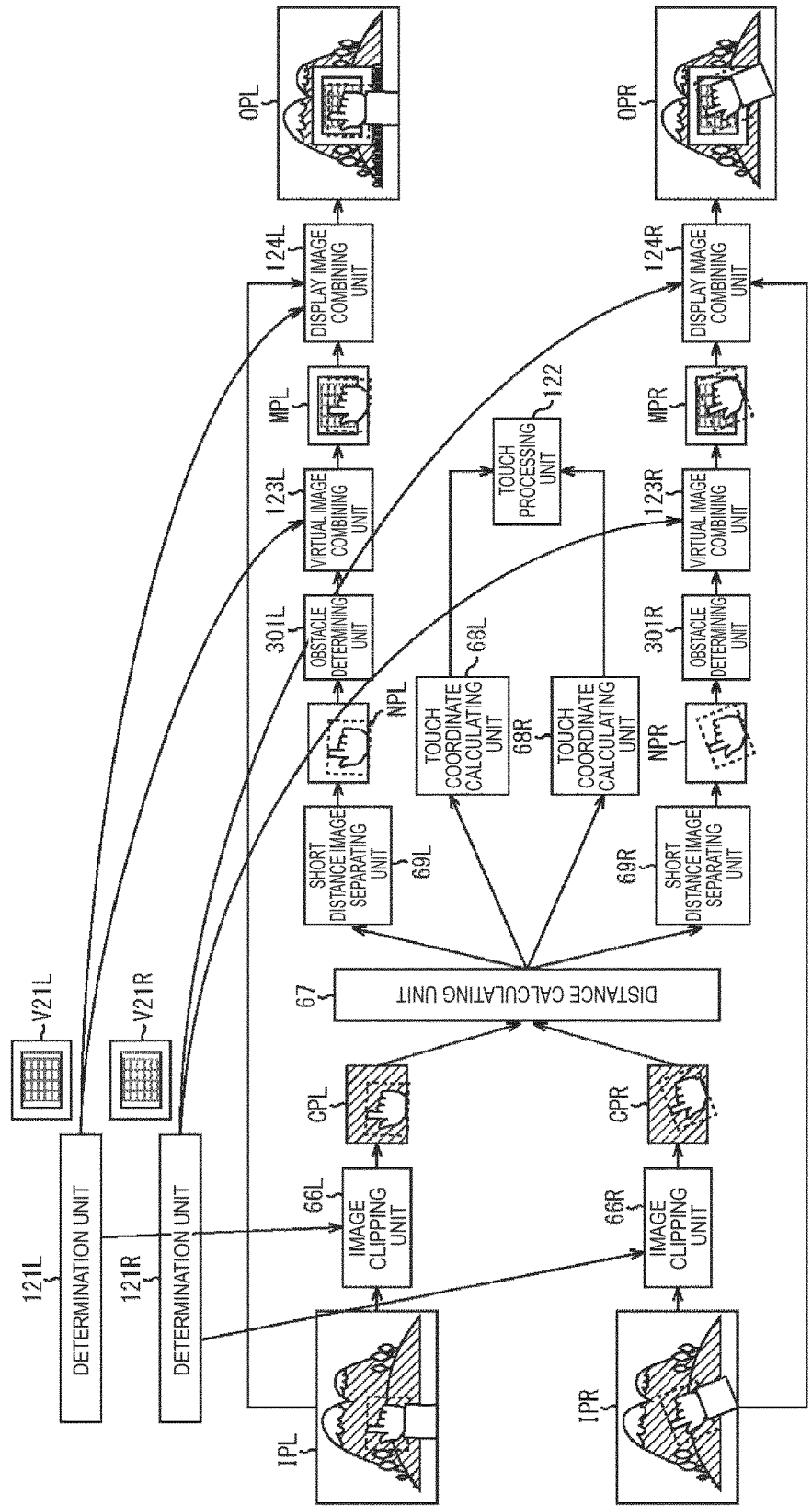
FIG. 20 is a diagram explaining a processing flow in obstacle detection.

In this manner, when the function of detecting the obstacle is provided, the display apparatus 11 shown in FIG. 3 performs the processing shown in FIG. 20 to determine whether or not the obstacle exists between the user and the display apparatus 11. Note that, in FIG. 20, the same sign is attached to a part corresponding to a part in FIG. 4, and the explanation thereof will be omitted appropriately.

In the example shown in FIG. 20, an obstacle determining unit 301L is provided between the short distance image separating unit 69L and the virtual image combining unit 123L, and an obstacle determining unit 301R is provided between the short distance image separating unit 69R and the virtual image combining unit 123R. For example, the obstacle determining unit 301L and the obstacle determining unit 301R are realized by the CPU 83.

For example, the ROM 84 or the like of the display apparatus 11 preliminarily records data such as a feature amount indicating a feature of a preliminarily registered operation object such as a user's hand and foot and a pen, as feature data. Here, the operation object is one used for operation for the virtual image such as the touch operation, and, when the user performs the operation on the virtual image by the hand, data indicating a general feature of the hand is used as the feature data. The display apparatus 11 records the feature data for one or a plurality of operation objects.

The obstacle determining unit 301L and the obstacle determining unit 301R detect the obstacle from the short distance image NPL and the short distance image NPR supplied from the short distance image separating unit 69L and the short distance image separating unit 69R using the preliminarily recorded feature data.

Specifically, a feature amount is extracted from the region of each object on the short distance image, for example, and compared with the feature amount of a preliminarily registered operation object, and it is determined whether or not the object on the short distance image is a registered operation object. Then, for example, when an object which is not the registered object exists on the short distance image, the object is determined to be an obstacle.

The obstacle determining unit 301L and the obstacle determining unit 301R, when determining that the obstacle does not exist on the short distance image, supplies the short distance image to the virtual image combining unit 123L and the virtual image combining unit 123R without change.

Further, the obstacle determining unit 301L and the obstacle determining unit 301R, when determining that the obstacle exists on the short distance image, cause a character message or an image indicating that the obstacle exists to be displayed on the output image, or cause a voice message indicating that the obstacle exists to be reproduced. In this case, the image indicating that the obstacle exists, for example, is combined with the short distance image and supplied to the virtual image combining unit 123.

Note that, in the following, when the obstacle determining unit 301L and the obstacle determining unit 301R do not have to be distinguished, each of them will be also simply called an obstacle determining unit 301.

(Explanation of the Display Position Adjustment Processing)

Figure 21:
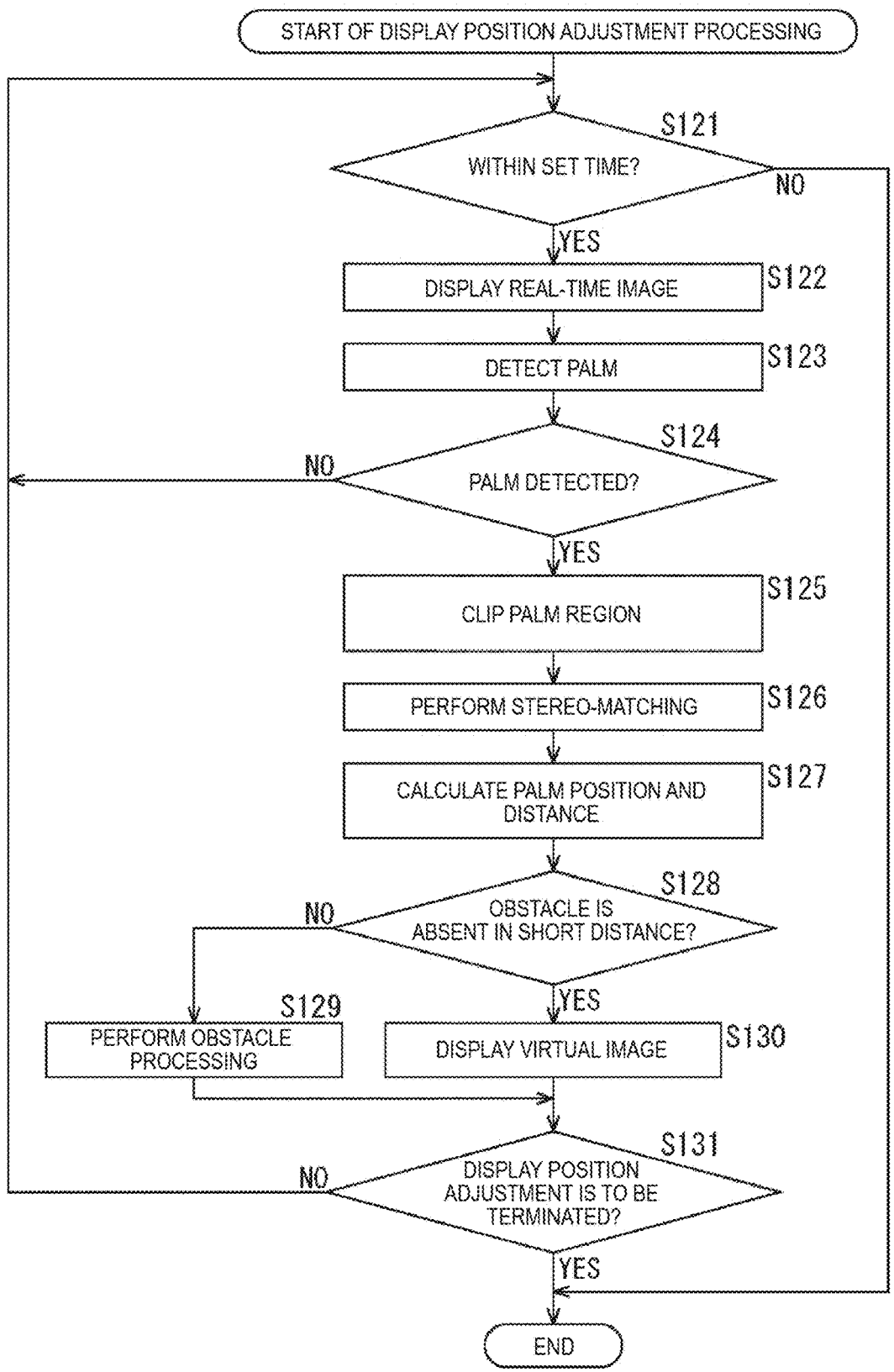
FIG. 21 is a flowchart explaining display position adjustment processing.

Next, with reference to the flowchart of FIG. 21, there will be explained display position adjustment processing that is processing in which the display apparatus 11 shown in FIG. 3 adjusts the display position of the virtual image according to the position of the user's palm and also detects the obstacle.

In step S121, the CPU 83 determines whether or not the elapsed time from the start of the processing is within a preliminarily set time. In step S121, when the elapsed time is determined not be within the preliminarily set time, the display position adjustment processing is terminated.

On the other side, in step S121, when the elapsed time is determined to be within the preliminarily set time, in step S122, the CPU 83 causes the image display unit 21 to display a real-time image as the output image. That is, the CPU 83 obtains the input image from the camera processing unit 65 via the image input unit 82 and the image output unit 70, and supplies the input image to the image display unit 21 via the image display processing unit 86 and the image output unit 87 to cause the input image to be displayed without change as the output image.

In step S123, the recognition unit 271 detects the user's palm from the input image supplied from the camera processing unit 65. For example the palm detection is performed by hand-shape recognition or the like using the feature amount or the like.

In step S124, the recognition unit 271 determines whether or not the palm is detected. When the palm is determined not to be detected in step S124, the process returns to step S121, and the above processing is repeated.

On the other side, when the palm is determined to be detected in step S124, the recognition unit 271 supplies the position of the palm and the size of the vicinity region of the palm which are obtained from the detection result, to the image clipping unit 66, and the process proceeds to step S125.

In step S125, the image clipping unit 66 clips the palm region from the input image to obtain the clipped image, based on the palm position and the vicinity region size from the recognition unit 271, and supplies the clipped image to the distance calculating unit 67.

In step S126, the distance calculating unit 67 performs the stereo-matching based on two of the left and right clipped images supplied from the image clipping units 66, and supplies the calculation result to the palm distance calculating unit 272. For example, by the stereo-matching, the parallax is obtained for each region of the clipped image. This parallax is information indicating the distance from the display apparatus 11 to the object existing in each region.

In step S127, the palm distance calculating unit 272 calculates the palm position on the clipped image and the distance from the imaging unit 22 (display apparatus 11) to the palm in the three-dimensional space, based on the calculation result of the stereo-matching supplied from the distance calculating unit 67.

When the position and distance of the palm are calculated in this manner, the determination unit 121 temporarily determines the position and distance of the palm to be a temporary position and distance of the virtual image, that is, the position of the virtual image in the three-dimensional space. Thereby, the temporary display position, size, and distance of the virtual image are determined from the position and distance of the palm.

After the display position, size, and distance of the virtual image have been determined in this manner, processing similar to the processing of step S12 to step S14 in FIG. 7 is performed and the short distance image is generated.

Then, in step S128, the obstacle determining unit 301 determines whether or not the obstacle exists in the short distance.

For example, the obstacle determining unit 301 detects the obstacle in the short distance image, that is, in the short distance from the user by comparing the preliminarily recorded feature data and data extracted from the short distance image supplied from the short distance image separating unit 69.

When the obstacle is determined to exist in step S128, the obstacle determining unit 301 performs the obstacle processing in step S129, and the process proceeds to step S131. That is, the obstacle determining unit 301 causes the character message or the image indicating that the obstacle exists to be displayed or causes the voice message indicating that the obstacle exists to be reproduced.

On the other side, when the obstacle is determined not to exist in step S128, the obstacle determining unit 301 supplies the short distance image from the short distance image separating unit 69 to the virtual image combining unit 123 without change, and the process proceeds to step S130.

In step S130, the display image combining unit 124 causes the virtual image to be displayed at the display position determined temporarily in step S127.

That is, the virtual image combining unit 123 combines the virtual image from the determination unit 121 with the short distance image supplied from the obstacle determining unit 301, and supplies the resultantly obtained composite image to the display image combining unit 124. Further, the display image combining unit 124 combines the composite image from the virtual image combining unit 123 with the input image from the camera processing unit 65 to obtain the output image, based on the display position and size of the virtual image determined by the position and size of the palm, and supplies the output image to the image display unit 21.

Thereby, the image display unit 21 displays the output image which displays the virtual image at the position of the user's palm.

After the processing of step S129 or step S130 has been performed, in step S131, the CPU 83 determines whether or not the display position adjustment of the virtual image is to be terminated. When the adjustment is determined not yet to be terminated in step S131, the process returns to step S121, and the above processing is repeated.

On the other side, when the adjustment is determined to be terminated in step S131, the display position adjustment processing is terminated. After the display position adjustment has been terminated, the touch recognition processing of FIG. 7 is performed assuming the display position, size, and distance of the virtual image determined in this processing to be the display position, size, and distance determined by the determination unit 121.

Note that, in the display position adjustment processing, the user may hold up the hand to specify the display position of the virtual image by the palm, and then the virtual image may be displayed at the specified position, or first the virtual image may be displayed, and then the user may specify the display position by the palm. In either case, the display position adjustment processing shown in FIG. 21 is performed in the display apparatus 11.

As above, the display apparatus 11 adjusts the display position and the like of the virtual image by detecting the palm from the input image, and also detects whether the obstacle exists between the virtual image and the user and performs the obstacle processing as needed.

In this manner, by adjusting the display position of the virtual image using the palm or the like, it is possible to improve the operability. Further, by detecting the obstacle and performing the obstacle processing, it is possible to realize a further higher safety in the use of the display apparatus 11.

Note that, while the example of generating the two of left and right output images based on the two of left and right input images is explained in the above, three or more input images may be used for obtaining the distance information in the distance calculating unit 67.

In such a case, two input images for the left eye and two input images for the left eye are used, the stereo-matching or the like is performed on a specific combination of two input images, and the distance to the object in each region of the clipped image is calculated. Further, for example, a center input image may be used in addition to the left and right input images for the calculation of the distance to the object in each region of the clipped image. By using three or more input images in this manner, it becomes possible to calculate the distance information more accurately.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose computer or the like that is capable of executing various functions when various programs are installed.

Figure 22:
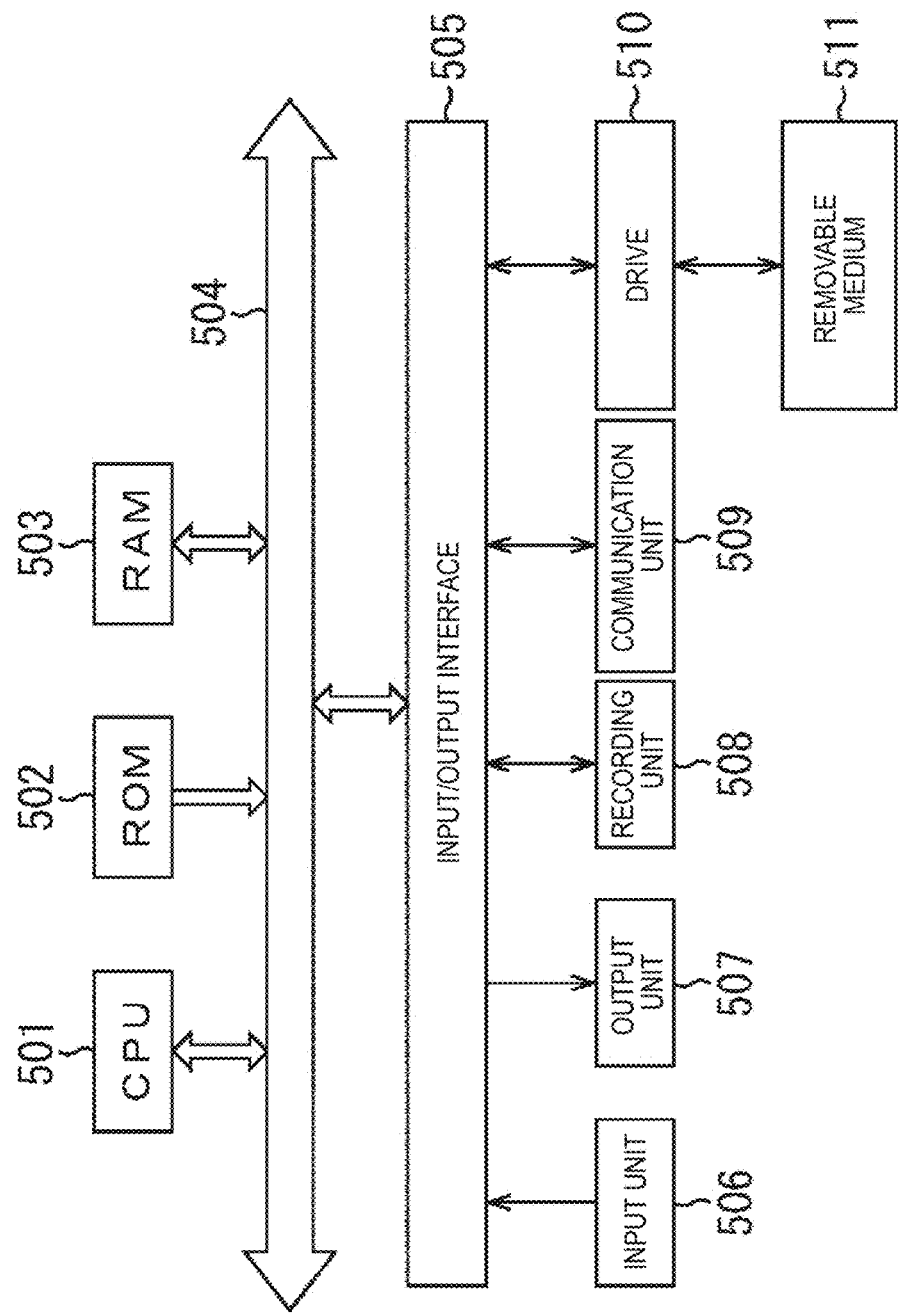
FIG. 22 is a diagram illustrating an exemplary configuration of a computer.

FIG. 22 is a block diagram showing an exemplary configuration of the hardware of a computer that executes the series of processes described earlier according to a program.

In a computer, a CPU 501, a ROM 502, and a RAM 503 are mutually connected by a bus 504.

An input/output interface 505 is also connected to the bus 504. An input unit 506, an output unit 507, a recording unit 508, a communication unit 509, and a drive 510 are connected to the input/output interface 505.

The input unit 506 is configured from a keyboard, a mouse, a microphone, an imaging device or the like. The output unit 507 configured from a display, a speaker or the like. The recording unit 508 is configured from a hard disk, a non-volatile memory or the like. The communication unit 509 is configured from a network interface or the like. The drive 510 drives a removable medium 511 such as a magnetic disk, an optical disk, a magneto-optical disk, a semiconductor memory or the like.

In the computer configured as described above, as one example the CPU 501 loads a program stored in the recording unit 508 via the input/output interface 505 and the bus 504 into the RAM 503 and executes the program to carry out the series of processes described earlier.

As one example, the program executed by the computer (the CPU 501) may be provided by being recorded on the removable medium 511 as a packaged medium or the like. The program can also be provided via a wired or wireless transfer medium, such as a local area network, the Internet, or a digital satellite broadcast.

In the computer, by loading the removable medium 511 into the drive 510, the program can be installed into the recording unit 508 via the input/output interface 505. It is also possible to receive the program from a wired or wireless transfer medium using the communication unit 509 and install the program into the recording unit 508. As another alternative, the program can be installed in advance into the ROM 502 or the recording unit 508.

Note that the program executed by the computer may be a program in which processes are carried out in a time series in the order described in this specification or may be a program in which processes are carried out in parallel or at necessary timing, such as when the processes are called.

An embodiment of the disclosure is not limited to the embodiments described above, and various changes and modifications may be made without departing from the scope of the disclosure.

For example, the present technique can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technique may also be configured as below.

[1]

An image processing apparatus including:

an image clipping unit configured to clip a predetermined region in a vicinity of a region where a virtual image to be operated is displayed, from two or more input images having respective parallaxes, to generate clipped images;

a distance calculating unit configured to calculate distance information of an object in each region of the clipped images based on two or more of the clipped images;

a touch position calculating unit configured to calculate a touch position of a user on the virtual image based on the distance information;

a touch processing unit configured to cause processing according to the touch position to be performed;

a short distance image separating unit configured to separate, for each of the clipped images, a region of the object that exists closer than the virtual image from the clipped image based on the distance information to generate a short distance image;

a virtual image combining unit configured to combine, for each of the short distance images, the short distance image with the virtual image to generate a composite image; and a display image combining unit configured to combine, for each of the composite images, the composite image with the input image to generate two output images having respective parallaxes.

[2]

The image processing apparatus according to [1], wherein the touch position calculating unit calculates a plurality of the touch positions, and wherein the touch processing unit causes processing specified by the plurality of touch positions to be performed.

[3]

The image processing apparatus according to [1] or [2], wherein the virtual image is displayed on a non-flat plane in a three-dimensional space, and wherein the touch position calculating unit calculates the touch position based on a position of the clipped image having a distance indicated by the distance information equal to a distance to the virtual image, using a distance different for each region of the virtual image.

[4]

The image processing apparatus according to any of [1] to [3], wherein the touch position calculating unit calculates the touch position based on a plurality of positions on the clipped image having a distance indicated by the distance information equal to a distance to the virtual image.

[5]

The image processing apparatus according to any of [1] to [4], wherein the input image is combined with a plurality of the virtual images to form the output image, and wherein the touch position calculating unit calculates the touch position for each of the virtual images.

[6]

The image processing apparatus according to any of [1] to [5], further including:

a correction unit configured to correct a display position, a display size, or a shape of the virtual image or a distance to the virtual image based on a change in a position or a direction of the image processing apparatus.

[7]

The image processing apparatus according to any of [1] to [6], further including:

a recognition unit configured to detect a preliminarily determined recognition target from the input image;

a recognition target distance calculating unit configured to calculate a distance to the recognition target based on a detection result of the recognition target; and a determination unit configured to determine a display position of the virtual image and a distance to the virtual image based on a position of the recognition target and the distance to the recognition target.

[8]

The image processing apparatus according to [7], wherein the recognition target is a palm of the user.

[9]

The image processing apparatus according to any of [1] to [8], further including:

an obstacle determining unit configured to determine whether or not an obstacle exists between the virtual image and the image processing apparatus by detecting a preliminarily determined operation object from the short distance image.

The image processing apparatus according to any of [1] to [9], wherein the distance calculating unit calculates the distance information by performing matching processing based on the clipped image.

[11]

The image processing apparatus according to [10], wherein the distance information is a parallax in each region of the clipped image.

[12]

The image processing apparatus according to any of [1] to [11], wherein the touch processing unit causes image display or sound reproduction to be performed according to the touch position.

[13]

The image processing apparatus according to any of [1] to [12], further including:

an imaging unit configured to capture the input image.

REFERENCE SIGNS LIST

11 display apparatus
21L, 21R, 21 image display unit
22L, 22R, 22 imaging unit
61 CPU
66 image clipping unit
67 distance calculating unit
68 touch coordinate calculating unit
69 short distance image separating unit
83 CPU
122 touch processing unit
123L, 123R, 123 virtual image combining unit
124L, 124R, 124 display image combining unit
231 sensor 271L, 271R, 271 recognition unit
272 palm distance calculating unit
301L, 301R, 301 obstacle determining unit

The invention claimed is:

1. A display apparatus comprising:
at least one processor; and
at least one non-transitory computer-readable medium having encoded thereon instructions that, when executed by the at least one processor, perform a method comprising:
clipping a region at least containing a virtual image to be displayed, from two or more input images having respective parallaxes, to generate clipped images;
calculating distance information of an object in each region of the clipped images based on two or more of the clipped images, wherein the distance information comprises a distance to the object in real space;
calculating a touch position of a user on the virtual image based on the distance information;
performing processing according to the touch position;
separating, for each of the clipped images, a region of the object that exists closer to a user side of the display apparatus than a position of the virtual image from the clipped image based on the distance information to generate a short distance image;
combining, for each of the short distance images, the short distance image with the virtual image to generate a composite image; and
combining, for each of the composite images, the composite image with the input image to generate two output images having respective parallaxes.

2. The display apparatus according to claim 1,
wherein calculating the touch position further comprises calculating a plurality of touch positions, and
wherein performing processing according to the touch position further comprises performing processing specified by the plurality of touch positions.

3. The display apparatus according to claim 1,
wherein the method further comprises displaying the virtual image on a non-flat plane in a three-dimensional space, and
wherein calculating the touch position further comprises calculating the touch position based on a position of the clipped image having a distance indicated by the distance information equal to a distance to the virtual image, using a distance different for each region of the virtual image.

4. The display apparatus according to claim 1,
wherein calculating the touch position further comprises calculating the touch position based on a plurality of positions on the clipped image having a distance indicated by the distance information equal to a distance to the virtual image.

5. The display apparatus according to claim 1,
wherein the method further comprises combining the input image with a plurality of virtual images to form the output images, and
wherein calculating the touch position further comprises calculating the touch position for each of the plurality of virtual images.

6. The display apparatus according to claim 1, wherein the method further comprises:
correcting a display position, a display size, or a shape of the virtual image or a distance to the virtual image based on a change in a position or a direction of the display apparatus.

7. The display apparatus according to claim 1, wherein the method further comprises:
detecting a preliminarily determined recognition target from the input image;
calculating a distance to the recognition target based on a detection result of the recognition target; and
determining a display position of the virtual image and a distance to the virtual image based on a position of the recognition target and the distance to the recognition target.

8. The display apparatus according to claim 7,
wherein the recognition target is a palm of the user.

9. The display apparatus according to claim 1, wherein the method further comprises:
determining whether or not an obstacle exists between the virtual image and the display apparatus by detecting a preliminarily determined operation object from the short distance image.

10. The display apparatus according to claim 1,
wherein calculating the distance information further comprises calculating the distance information by performing matching processing based on the clipped image.

11. The display apparatus according to claim 10,
wherein the distance information is a parallax in each region of the clipped image.

12. The display apparatus according to claim 1,
wherein performing processing according to the touch position further comprises performing image display or sound reproduction according to the touch position.

13. The display apparatus according to claim 1, wherein the method further comprises:
capturing the input image.

* * * * *